(12) United States Patent
McKimmey et al.

(10) Patent No.: US 12,388,237 B2
(45) Date of Patent: Aug. 12, 2025

(54) PREFABRICATED ELECTRICAL MODULE AND SYSTEM

(71) Applicant: RodNick LLC, Reno, NV (US)

(72) Inventors: Rodney Lee McKimmey, Reno, NV (US); Nicholas Bartholomew, Reno, NV (US)

(73) Assignee: RodNick LLC, Reno, NV (US)

( * ) Notice: Subject to any disclaimer, the term of this patent is extended or adjusted under 35 U.S.C. 154(b) by 226 days.

(21) Appl. No.: 18/474,193

(22) Filed: Sep. 25, 2023

(65) Prior Publication Data

US 2024/0022047 A1 Jan. 18, 2024

Related U.S. Application Data

(63) Continuation-in-part of application No. 17/882,558, filed on Aug. 6, 2022, now Pat. No. 11,769,994, which is a continuation-in-part of application No. 17/499,647, filed on Oct. 12, 2021, now Pat. No. 11,923,665, which is a continuation-in-part of
(Continued)

(51) Int. Cl.
*H02G 3/08* (2006.01)
*H02B 1/015* (2006.01)
*H02B 1/40* (2006.01)

(52) U.S. Cl.
CPC .............. *H02B 1/015* (2013.01); *H02B 1/40* (2013.01)

(58) Field of Classification Search
CPC .......... H02G 3/08; H02G 3/081; H02G 3/086; H02G 3/088; H02G 3/083; H02G 3/105; H02G 3/0431; H02G 3/00; H05K 5/00; H05K 5/02; H05K 5/04; H05K 5/0209; H05K 5/0217; H05K 5/0247; H01H 71/0271; H01H 71/06; H02B 1/015; H02B 1/04; H02B 1/28; H02B 1/202; H02B 1/042; H02B 1/40
USPC ... 174/50, 480, 481, 520, 535, 559, 560, 53, 174/57, 58, 17 R; 220/3.2–3.8, 4.02; 361/600, 601, 605, 641, 659, 679.01
See application file for complete search history.

(56) References Cited

U.S. PATENT DOCUMENTS 5,136,463 A * 8/1992 Webster .................. H02B 7/06
174/559
5,378,058 A * 1/1995 Tessmer .................. H02B 1/50
312/298

(Continued)

*Primary Examiner* — Angel R Estrada
(74) *Attorney, Agent, or Firm* — Connie R. Masters

(57) ABSTRACT

A prefabricated electrical module and system along with fabrication and installation methods are provided. The prefab electrical module includes a circuit breaker panel casing that houses multiple circuit breakers, and a chase extending upwardly from the panel casing that stows coiled lengths of homerun wiring attached to the circuit breakers. During transport, a temporary panel casing front cover protects the panel casing front, and a forwardly protruding guard cover with an upwardly projecting hoisting handle shields the front and top of the chase and wiring. During installation, a hoisting bracket is attached at the top of the stud bay into which the prefab electrical module will be installed. A drill-powered winch is then used to lift the module to the proper height in the bay. The panel casing, chase, wiring, and breakers remain in the wall. The hoisting bracket, temporary panel casing front cover, guard cover, drill, and winch are reusable.

15 Claims, 18 Drawing Sheets

Related U.S. Application Data application No. 29/727,373, filed on Mar. 10, 2020, now Pat. No. Des. 999,175, and a continuation-in-part of application No. 29/727,329, filed on Mar. 10, 2020, now Pat. No. Des. 1,002,555, and a continuation-in-part of application No. 29/727,367, filed on Mar. 10, 2020, now Pat. No. Des. 1,012,865, and a continuation-in-part of application No. 29/727,382, filed on Mar. 10, 2020, now Pat. No. Des. 987,586.

(60) Provisional application No. 63/338,366, filed on May 4, 2022, provisional application No. 63/090,699, filed on Oct. 12, 2020.

(56) References Cited

U.S. PATENT DOCUMENTS

| | | | | |
|---|---|---|---|---|
| 6,100,468 | A * | 8/2000 | Niggl | H05K 7/1447 174/559 |
| 6,861,585 | B1 * | 3/2005 | Kiely | H01R 9/2475 174/53 |
| 6,881,898 | B2 * | 4/2005 | Baker | H02B 1/32 361/600 |
| 7,724,507 | B2 * | 5/2010 | Whitt | H02B 1/28 312/234.1 |
| 7,812,253 | B2 * | 10/2010 | Moselle | H02G 3/088 174/480 |
| 7,947,901 | B2 * | 5/2011 | Leopold | H02G 3/088 174/67 |
| 7,968,806 | B2 * | 6/2011 | Shelton | H05K 5/15 174/67 |
| 8,113,874 | B2 * | 2/2012 | Lacey | H02G 3/18 174/53 |
| 8,642,885 | B2 * | 2/2014 | Davila | H02G 3/086 174/50 |
| 9,236,717 | B2 * | 1/2016 | Bravo | H02B 1/32 |

* cited by examiner

PREFABRICATED ELECTRICAL MODULE AND SYSTEM

CROSS-REFERENCE TO RELATED APPLICATIONS

The present application is a continuation of currently pending U.S. application Ser. No. 17/882,558 issuing as U.S. Pat. No. 11,769,994 on Sep. 26, 2023, which claims priority to U.S. Provisional Application No. 63/338,366 filed on May 4, 2022 and which is a continuation-in-part of currently pending U.S. application Ser. No. 17/499,647 filed on Oct. 12, 2021; U.S. application Ser. No. 17/499,647 claims priority to U.S. Provisional Application No. 63/090,699 and is a continuation-in-part of U.S. application Ser. Nos. 29/727,382, 29/727,367, 29/727,373, and 29/727,329 that were filed on Mar. 10, 2020; the entire contents of the aforesaid applications being incorporated herein by reference.

FIELD OF INVENTION

This invention relates generally to distribution of electric power, and, more particularly, to modules, frameworks, casings, and parts thereof for use in an electrical construction system along with fabrication and installation techniques and methods thereof.

BACKGROUND OF THE INVENTION

Construction of any new building takes considerable time and manpower, but construction of multi-unit buildings and complexes presents significant additional logistical challenges, which lead to increased costs. Many workers are needed, and some types of work must be completed before other types of work can be started. Thus, the correct materials and the proper workers must be in the right place, at the right time, and in the right order.

Typically, basic materials are transported to the construction site and assembled onsite by workers. One major bottleneck is the installation of the electrical system in the unit under construction, which is especially a factor in multi-unit buildings. With traditional construction methods electricians cannot begin the electrical rough installation process until the building is "dried-in," which means that framing and the installation of all windows, doors, and roofing is complete to create a weatherproof building envelope. Inspectors require the building to be dried-in prior to installation of electrical systems to ensure no moisture begins to deteriorate non-waterproofed materials. If there are several floors in residential or commercial developments, quite a significant amount of time is spent waiting before the electrical installation can even begin on the first floor. Thus, multi-unit construction is particularly expensive due to labor costs, time delays due to logistical issues, and slow or delayed rough inspection processes.

Other problems in electrical installations in new construction are due to construction site issues such as material wastage or loss, quality control, and installation inconsistencies caused by differing installation procedures used by the various onsite electricians.

Accordingly, there is a need for an electrical construction system and methods that minimize labor costs in the field, reduce time delays, increase consistent high-quality installations, and reduce the time until the rough electrical installation is finished so that the rough electrical inspection can be accomplished, because the cost savings can be quite significant.

BRIEF SUMMARY OF THE INVENTION

The present invention is directed to a prefabricated ("prefab") electrical module that is weatherized for installation into a stud bay opening in a wall during construction of a building, and that is particularly suited for easy and early installation into multiple units of a multi-unit building before building dry-in has been achieved. In the multi-unit building use case, for each unit, the prefab electrical module carrying the homerun wiring for the unit is installed early (before dry-in). The electrical modules for the lower floors can be installed before the upper floors are completed; this allows wiring of the units of a lower floor to occur weeks or months ahead of the traditional schedule controlled by the dry-in date. The present invention is also directed to systems and methods for fabrication, shipping, and installation of the prefab electrical module.

The prefab electrical module comprises a lower compartment and an upper compartment. The lower compartment houses the circuit breaker panel casing with installed breakers to which the unit's homerun wiring is connected. The chase forms the rear portion of the upper compartment, and the guard cover forms the front portion of the upper compartment. The upper compartment houses the homerun wiring that is pre-cut to the required length, and which is stored in, and carried by, the electrical module. (A homerun length of wiring is the length of wiring needed to reach from the breaker to the first outlet or switch including sufficient length to run the wiring and to accomplish the connection.)

The circuit breaker panel casing includes a top wall, bottom wall, side walls, and back that together define a lower compartment space of the electrical module, which, for the main electrical panel for the unit, houses multiple breakers. Though the circuit breaker panel casing is typically metal, it may optionally be formed of other materials, such as plastic, or may be formed of a combination of materials, such as plastic and metal. Although the electrical module of the invention is described in terms of a circuit breaker panel casing with breakers connected within it, the module may alternatively enclose a low-voltage assembly or other electrical component assembly. Therefore, the inventive electrical module may be used for any electrical component assembly for a residential or commercial installation and is not limited to the main electrical service panel described herein.

The chase extends upwardly from the circuit breaker panel casing to define the rearmost portion of an upper compartment space. A guard cover fits over and extends outwardly from the front of the chase to form the forward portion (top, front sides, and front) of the upper compartment space. Therefore, together the chase and guard cover define the upper compartment space. The upper compartment space is used for holding the unit's homerun wiring during transport to the jobsite and at the jobsite until the wiring is run to the nearest switches and/or outlets in the unit. Strands of wiring, which have been cut to designated homerun lengths are secured onto the back of the chase but project outwardly beyond the frontmost portion of the chase. The front of the chase and the wiring protruding beyond the frontmost portion of the chase is covered by and protected by the removable guard cover during shipping and after installation of the module within a stud bay, until it is no longer needed after the module's wiring is run to the homerun switches and outlets.

The prefab electrical module and system include permanent components that remain within the stud bay after completion of the unit and include components that are used in transport and/or installation of the module but that then can be reused during transport and/or installation of other prefab electrical modules. The permanent components include the unit's homerun wiring, a circuit breaker panel casing that houses multiple breakers, and a chase attached to and extending above the panel casing. The reusable components of the module include a temporary panel casing front cover for the circuit breaker panel casing and a guard cover for shielding the front and top of the chase (and its carried wiring) during transport and installation. Other parts of the system are also reusable. Shipping pallets that have carried the modules to the jobsite can be reused. During module installation, a hoisting bracket is attached at the top of a stud bay. A drill-powered winch and a handheld drill are used with the hoisting bracket to lift the module into the bay. These are reusable for the installation of multiple modules.

When the electrician at the fabrication facility connects the wiring to the breakers within the panel casing, predetermined electrical layout plans are followed. The breaker and/or wire is labeled.

In aspects, the wiring may be routed downwardly or upwardly. In a preferred aspect, each of the strands of wiring are routed from the upper compartment space downwardly into the lower compartment space where the proximal end is connected to a breaker in the circuit breaker panel casing; the distal portion of each strand of wiring is coiled to fit within the upper compartment space. In an alternative aspect, the proximal end of the wiring may be connected to a breaker first and then the distal portion of the wiring may be routed upwardly and coiled for storing in the upper compartment space.

In the preferred aspect of the invention, the prefab electrical module is further weatherized. The top and back of the panel casing are covered with a waterproof membrane. The wiring comprises weatherproof and/or outdoor wiring. The openings in the top wall of the panel casing through which the wiring runs are sealed, such as by the use of waterproof putty, such as may be sold as electrical insulation putty. Further, a waterproof weatherstrip is attached between the front face of the panel casing and the temporary panel casing front cover to provide additional protection from weather.

To transport the prefab electrical module to the jobsite, the front of the panel casing is covered by the temporary panel casing front cover, which encloses the circuit breakers in the lower compartment. The top and front of the chase and of the forwardly projecting wiring are covered and protected by the guard cover. The guard cover has an upper hoisting handle that is attached securely enough to allow lifting of the prefab electrical module. Multiple modules may be stacked on pallets and shipped to the jobsite for distribution to the individual residential or commercial units.

To install a prefab electrical module into the residential or commercial unit for which it has been prepared, a hoisting bracket is preferably installed at the top of the stud bay into which the prefab electrical module will be permanently mounted. A drill-powered winch is attached between the hoisting bracket and the hoisting handle to lift the module into the bay and to easily position it at the proper height where it is then fixedly attached to the stud walls.

The inventive prefab electrical module and its fabrication, transport, and installation systems and methods provide many advantages over conventional circuit breaker panel installations. Use of the prefab electrical module eliminates the most time-consuming part of installing a unit's electrical system, which is making up the circuit breaker panel at the jobsite, which includes at least attaching the proximal end of each wire to the proper circuit breaker per the pre-specified electrical layout and labeling the breaker and/or wire. Using the inventive module that provides pre-completed circuit breaker wiring reduces labor costs in the field, which reduces the overall cost of construction, since on-site labor costs are higher than labor costs in the fabrication plant. It also provides uniformity and consistency of the wiring of the circuit breaker panels of the units. Using the prefab electrical module for electrical installations during construction also reduces lost or wasted material, because homerun wiring of the correct type is pre-cut to the exact length needed for each circuit and is transported to the specific unit within the prefab electrical module designated for that unit.

A significant advantage is that the weatherproofing of the prefab electrical module enables early installation and advances the timeline for the rough electrical inspection. The rough electrical installation on the lower floor or floors of a multi-floor building can be completed without waiting for the building envelope to be dried-in. Consequently, the rough electrical inspection can be moved up in time, potentially shaving months of time off a construction schedule for multi-floor buildings, with the amount of time saved increasing substantially as the number of units and/or floors in the building being constructed increases. This allows projects to finish earlier and allows income generation from sales or rentals to begin sooner.

Additionally, the instant invention increases quality consistency and reduces material wastage compared to making up the circuit breaker module at the building site. Time-consuming mistakes are eliminated because the making up of every circuit breaker panel is consistent. This contrasts with conventional installations in which panels are made up differently by different electricians in the field. Every inventive prefab electrical module goes through strict quality control checks by experienced electricians, thus delivering assurance of reliability and quality to the building owners.

Further, the prefab electrical modules provide shipping advantages. The modules are fabricated in a consistent height, width, and depth for easy transport. Multiple inventive modules can be palletized and shipped on standard pallets thus reducing transportation costs and enabling worldwide shipping. Prefab electrical modules for an entire floor of apartments or for a full section of homes can be shipped from the fabrication facility at once, instead of being created one by one in the field.

In addition, the specific configuration of the prefab electrical module allows installation into a wall formed by conventionally sized 2×4 studs (or, optionally, in the less common 2×6 sized wall stud bays). The chase is attached above the panel casing carrying the circuit breakers with the removable guard cover extending forwardly from the front of the chase. The chase and the panel casing have a depth equal to or less than the depth of the wall studs. The guard cover extends beyond the front edges of the 2×4 wall, but it is only used temporarily to cover the wiring; it is removed after the homerun wiring is run. Thus, the portions of the prefab module that remain in the wall have a depth that is accommodated by the 2×4 wall studs. This provides a significant advantage because the prefab module is readily usable in standard 2×4 walls.

Though the prefab electrical module is shown and described herein as a main service electrical panel assembly, the housings and panel casings can also be used to fabricate, transport, and install other electrical assemblies, such as a low-voltage electrical assembly or the like.

Though this description focuses on the usage of the prefab electrical module, methods of fabrication, and installation of the modules for on-site construction, the invention also provides advantages for prefabrication construction at a manufacturing facility, such as at a wall prefabrication factory. When the modules are installed at a factory into prefabricated walls, they reduce cost and waste and increase consistency, uniformity, and reliability.

The object of the invention is to provide a system and method for electrical installation, particularly during initial building construction, which gives an improved performance over the prior art systems and methods.

These and other objects, features, and advantages of the present invention will become more readily apparent from the attached drawings and from the detailed description of the preferred embodiments which follow.

BRIEF DESCRIPTION OF THE SEVERAL VIEWS OF THE DRAWINGS

The preferred embodiments of the invention will hereinafter be described in conjunction with the appended drawings, provided to illustrate and not to limit the invention, where like designations denote like elements.

Like reference numerals refer to like parts throughout the several views of the drawings.

DETAILED DESCRIPTION OF THE INVENTION

Figure 1:
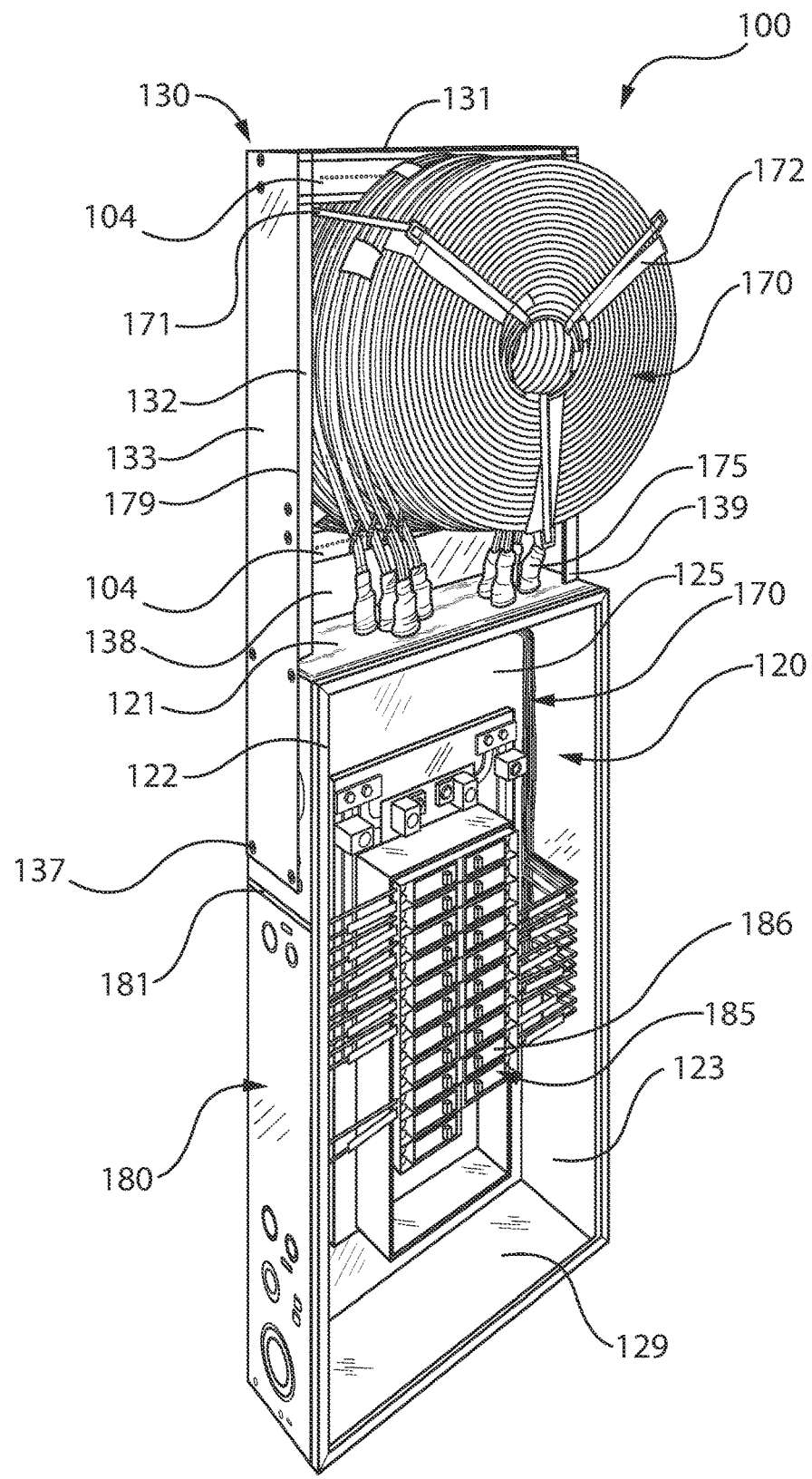
FIG. 1 is a perspective front view of an embodiment of the prefab electrical module of the present invention with mounted wiring and before installation of the guard cover and temporary panel casing front cover for transport.

Shown throughout the figures, the present invention is directed toward a prefabricated ("prefab") electrical module 100 used in building construction and toward methods of fabrication 230 (FIG. 23) and methods of transport and installation 240 (FIG. 24) of the modules 100. Usage of the modules 100 provides advantages for on-site construction because it enables early (before dry-in) installation to allow the rough electrical inspection to be moved quite significantly earlier. The design of the modules 100 also minimizes the cost for shipping or transport to the place at which the installation will occur, because multiple modules 100 can be palletized. The systems and methods provided together create a system usable in all residential and commercial construction, but which is particularly suitable for use in the electrical installation of multi-family or other multi-unit construction.

The components of the prefab electrical module 100 that will remain permanently within the building include a circuit breaker panel casing 180, a set of circuit breakers 185, a chase 130, and the homerun wiring 170. The interior of the circuit breaker panel casing 180 defines the back, top, bottom, and sides of a lower compartment space 120 that houses the set of circuit breakers 185. The interior of the chase 130 defines the back and sides of an upper compartment space no for carrying the unit's homerun wiring 170 during transport. Each strand of wiring 170 is attached to a breaker 186 in the panel casing 180 and is run into the chase's upper compartment space no where it is coiled and stored until installation.

Figure 4:
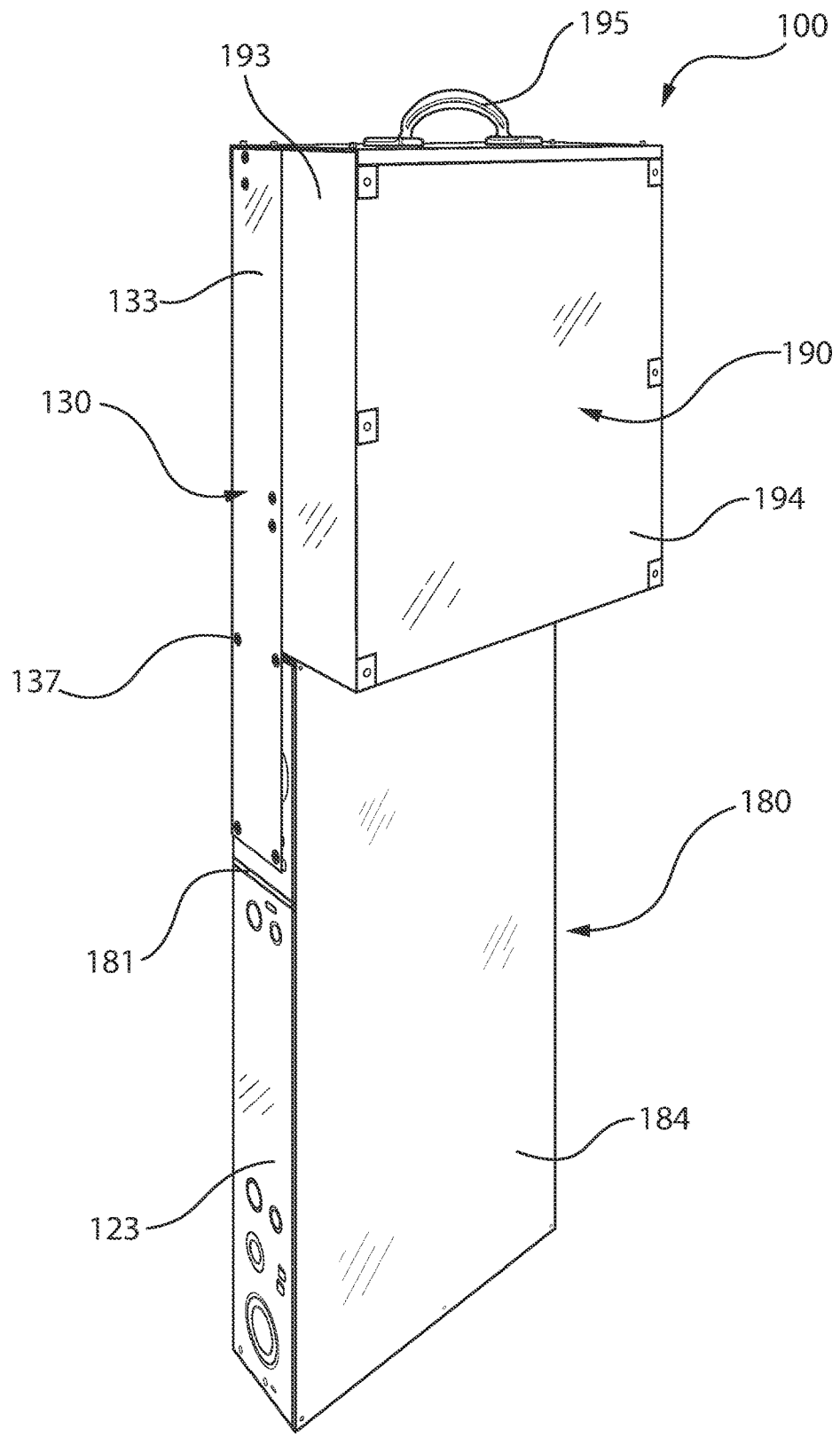
FIG. 4 is a perspective front view of an embodiment of the prefab electrical module of the present invention with the upper guard cover and temporary panel casing front cover installed.
Figure 5:
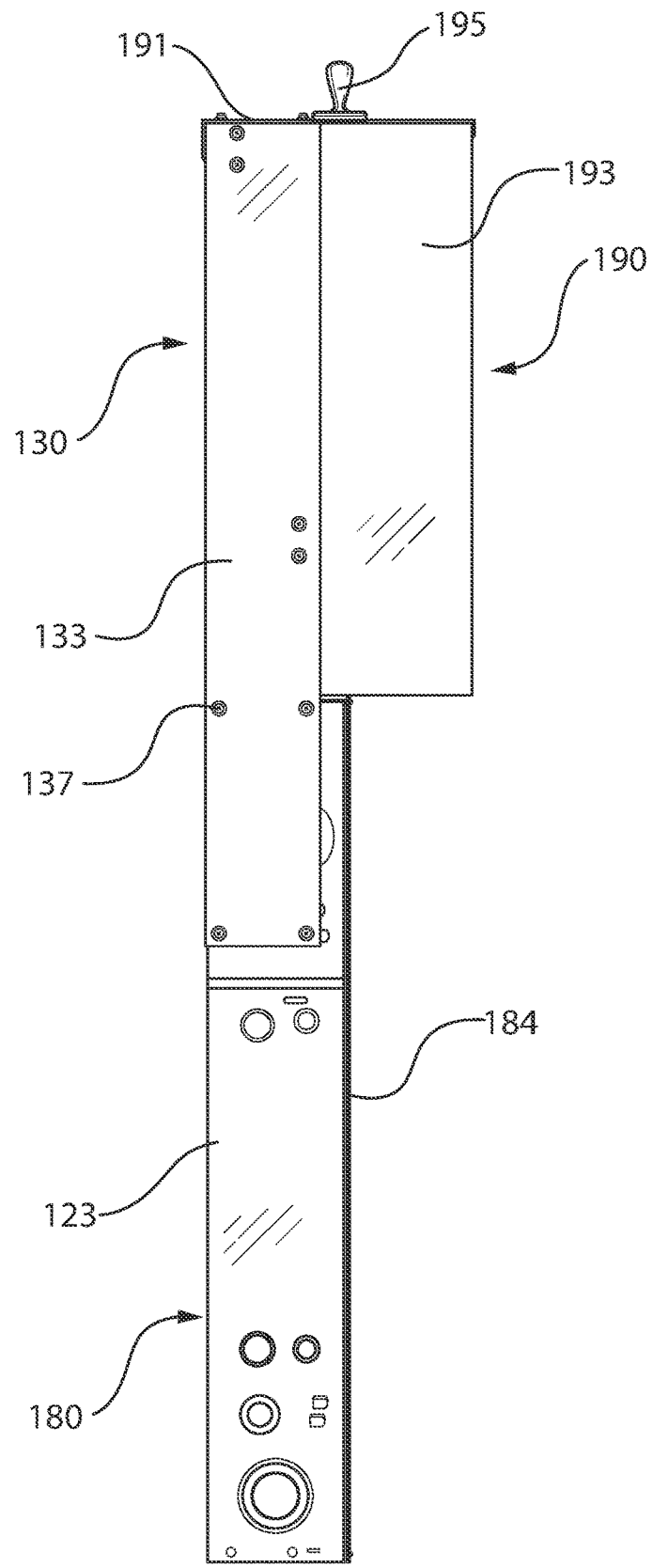
FIG. 5 is a left side view of an embodiment of the prefab electrical module of the present invention with the guard cover and temporary panel casing front cover installed.

The non-permanently installed and/or reusable components of the prefab electrical module 100 are a temporary panel casing front cover 184 (FIG. 14) and a guard cover 190 (FIG. 4). The temporary panel casing front cover 184 fits over the front face of the panel casing 180 to enclose it to provide protection during shipping and to provide weatherproofing after installation into the stud bay but before running of the wiring 170. The panel casing front cover 184 defines the front of the lower compartment. Thus, the panel casing front cover 184 together with the circuit breaker panel casing 180 define the lower compartment space 120.

The guard cover 190 fits over the top of the chase 130 and projects forwardly from the front of the chase 130. The guard cover 190 defines the top, the forward portion of the bottom, the forward portions of the sides, and the front portion of the upper compartment space 100. Thus, the guard cover 190 together with the chase 130 define the upper compartment space no. The guard cover 190 is configured with an upper hoisting handle 195.

Figure 14:
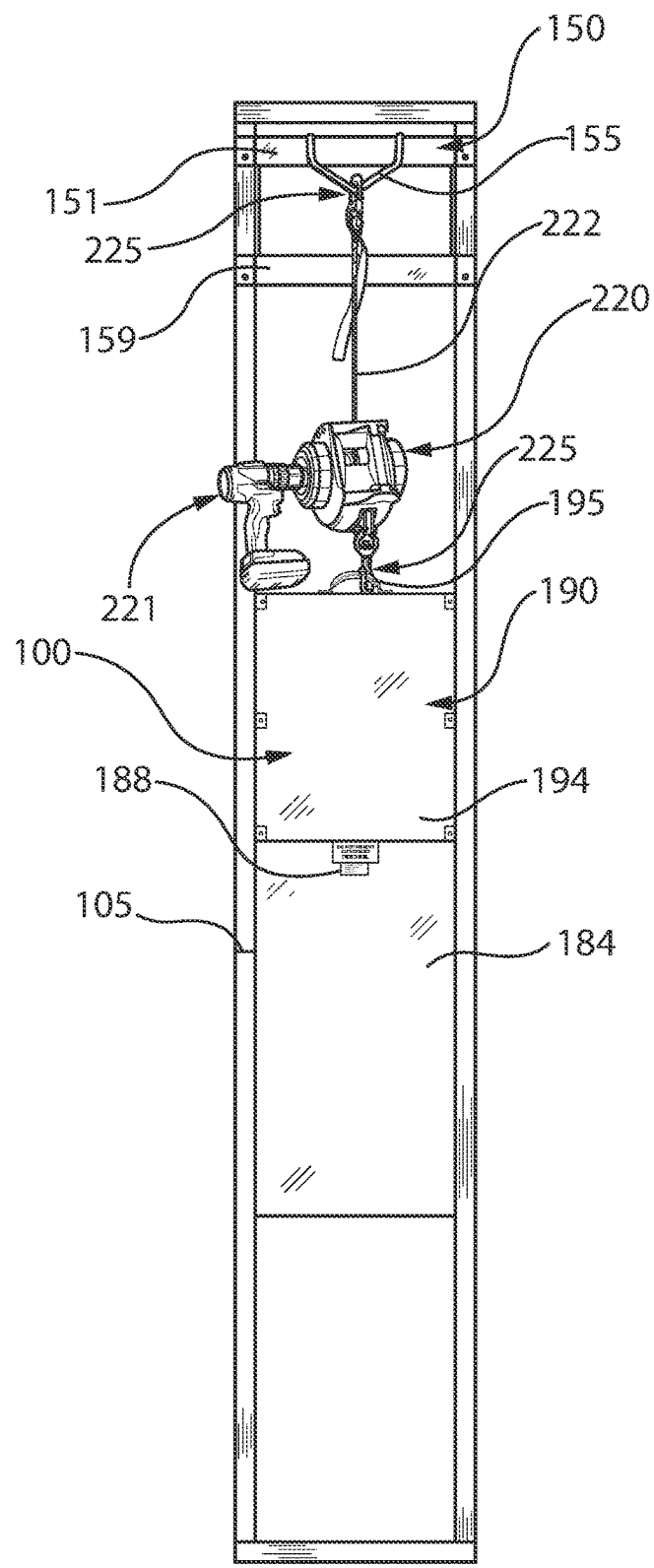
FIG. 14 is a front view of the installation into a stud bay of a prefab electrical module of the present invention with the guard cover and temporary panel casing front cover installed and with the hoisting bracket, winch, and drill positioned to lift and lifting the module into place within the stud bay.

Other components in the prefab electrical system that are used during mounting of the module 100 into the stud bay 210, and that are reused in installing multiple modules, include a hoisting bracket iso and a drill hoist 220 powered by a drill 221 (FIG. 14).

The circuit breaker panel casing 180 includes a top wall 121, opposing side walls 123, a back wall 125, and a bottom wall 129. A set of circuit breakers 185 is fixedly attached within the panel casing 180.

Figure 18:
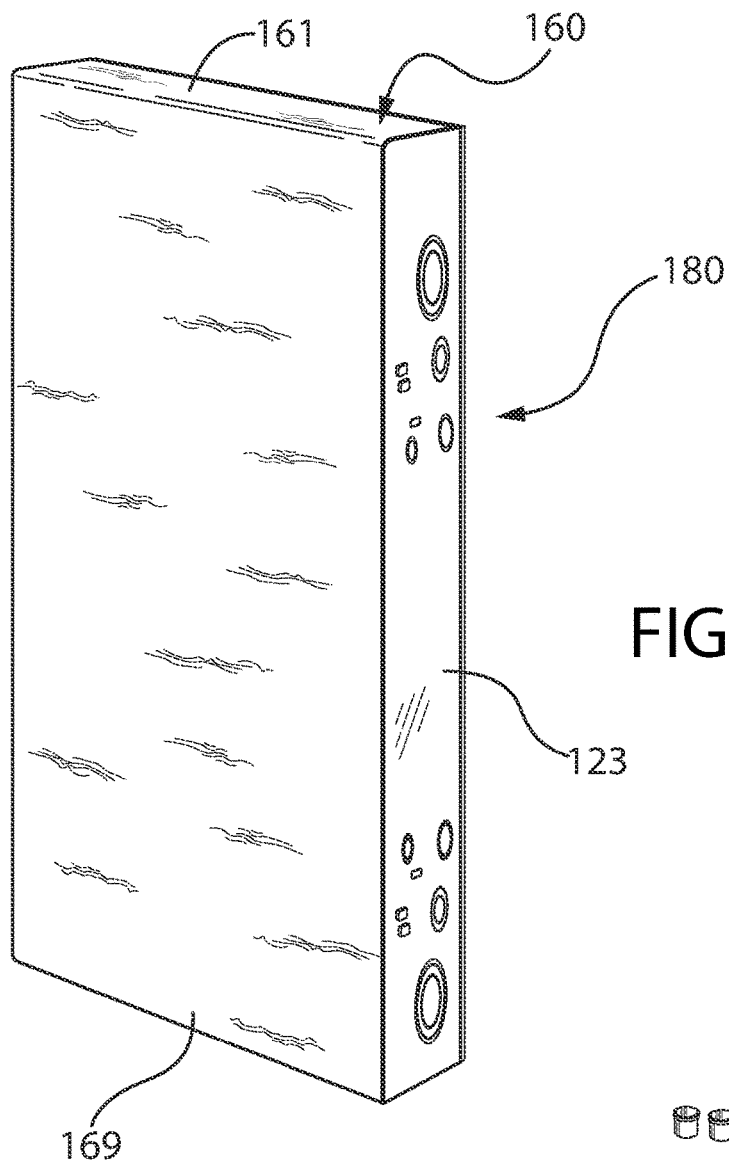
FIG. 18 is a perspective back view of the circuit breaker panel casing of the present invention that is weatherized by the addition of a waterproof membrane.
Figure 19:
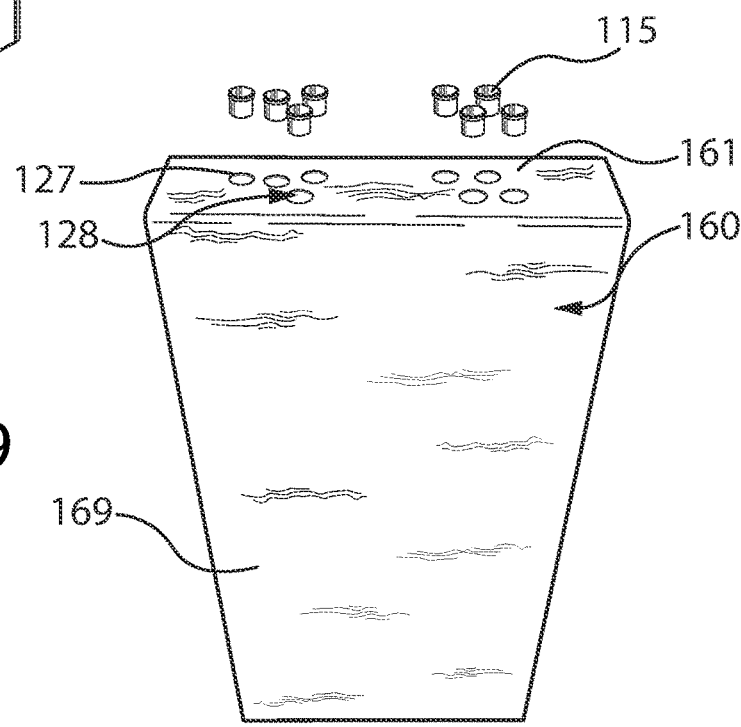
FIG. 19 is a perspective top view of the circuit breaker panel casing of the present invention that is weatherized by the addition of a waterproof membrane.

To weatherize the panel casing 180, a waterproof membrane 160 (FIGS. 18-19) is applied 232 (FIG. 23) to the outer upper surface of the top wall 121 and to the outer rear surface of the back wall 125. The waterproof membrane 160 may comprise any thin waterproof material, fabric, or sheeting that self-adheres or can be adhered to the outside surface of the panel casing 180. A membrane top portion 161 is adhered to the top surface of the panel casing top wall 121, and a back portion 169 of the membrane is adhered to the outside surface of the panel casing back 125. In a preferred aspect of the invention, the waterproof membrane comprises a self-adhering roofing underlayment, such as sold under the trademark of GRACE ICE & WATER SHIELD. In this aspect, the self-adhering roofing underlayment is formed of a rubberized asphalt adhesive backed by a layer of release film that protects its adhesive quality. The modified bitumen forms a watertight seal even if there is an accidental puncture of the waterproof membrane 160. The release film is easily removed. The rubberized asphalt layer bonds tightly to the back and sides of the panel casing 180. After application of the waterproof membrane, holes 128 defined by hole edges 127 (FIG. 19) may be cut, as needed, to allow the wiring 170 to be routed between the upper compartment space no and the lower compartment space 120.

Though a waterproof membrane 160 is disposed on the top wall 121 and the back wall 125 of the panel casing 180, no waterproof membrane 160 is disposed on the chase 130 or the guard cover 190. The panel casing 180 forms a watertight compartment without the need to use extra waterproof membrane 160 on any other portion of the module 100. This saves on the cost of materials, reduces costs for the module fabricator that can be passed along to the unit developer, and reduces the environmental impact by reducing the amount of materials used. (The use of a waterproofing material 175 around the portion of wire 170 running through hole 128 aids in creating a watertight compartment.)

Figure 2:
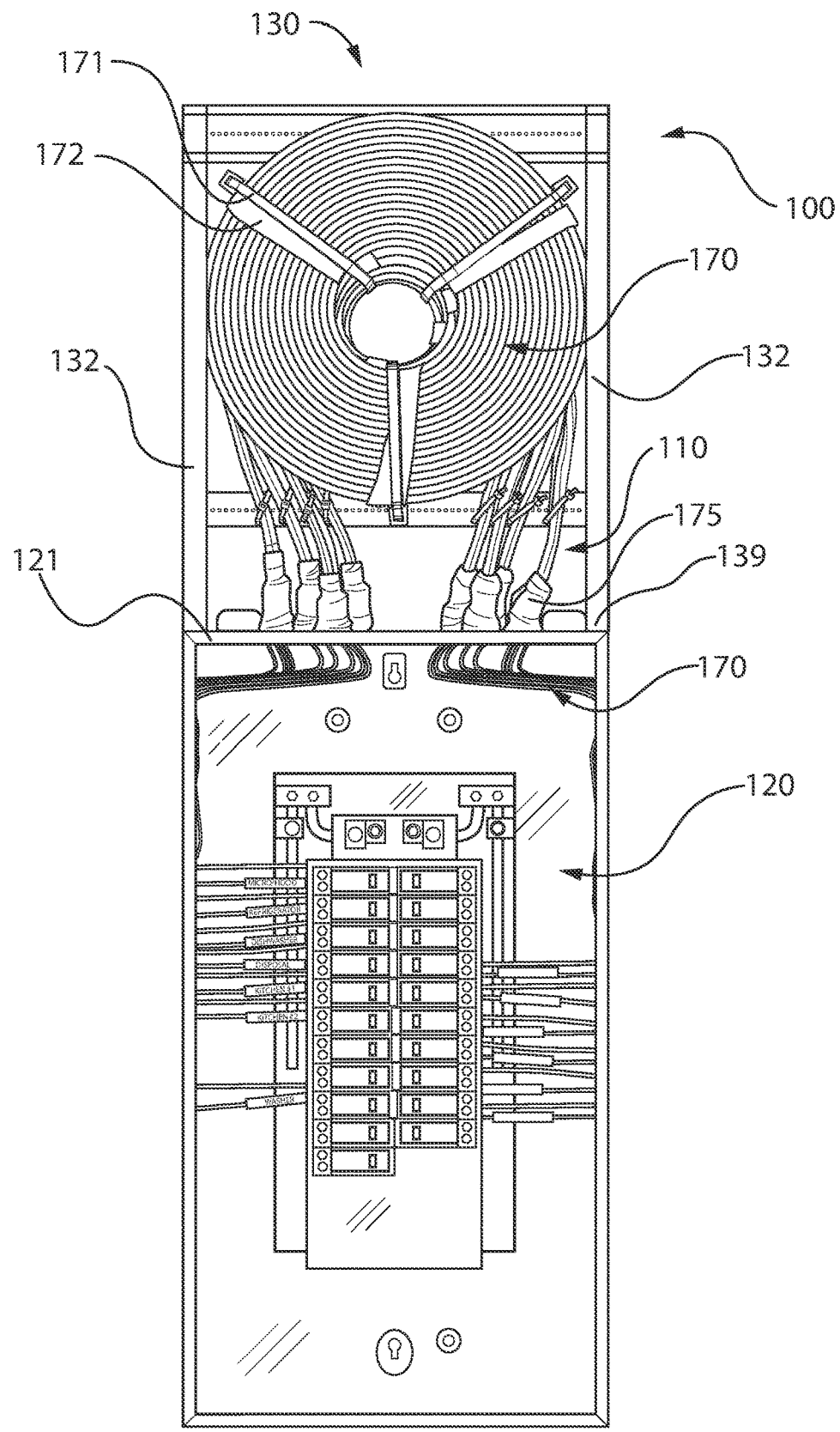
FIG. 2 is a front view of an embodiment of the prefab electrical module of the present invention with mounted wiring and before installation of the guard cover and temporary panel casing front cover for transport.
Figure 3:
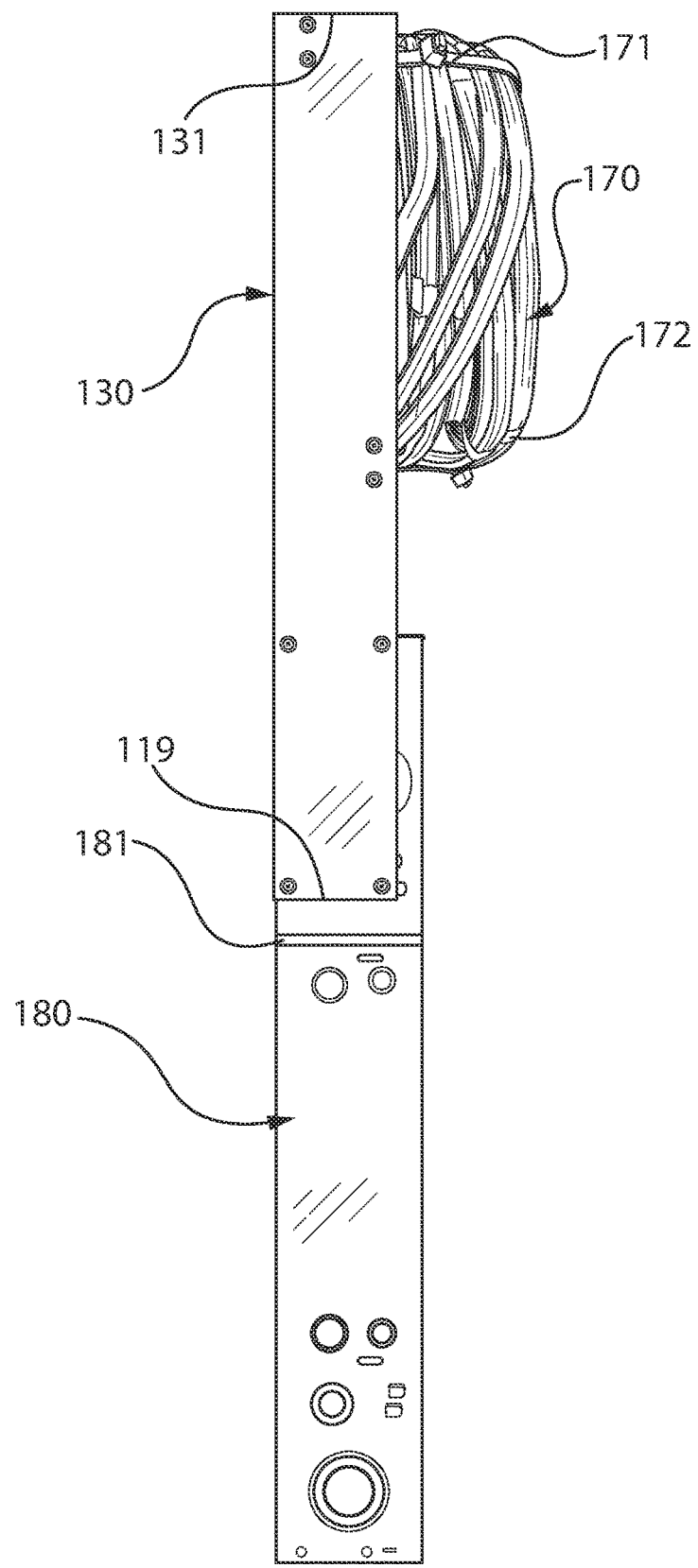
FIG. 3 is a left side view of an embodiment of the prefab electrical module of the present invention with mounted wiring and before installation of the guard cover and temporary panel casing front cover for transport.
Figure 6:
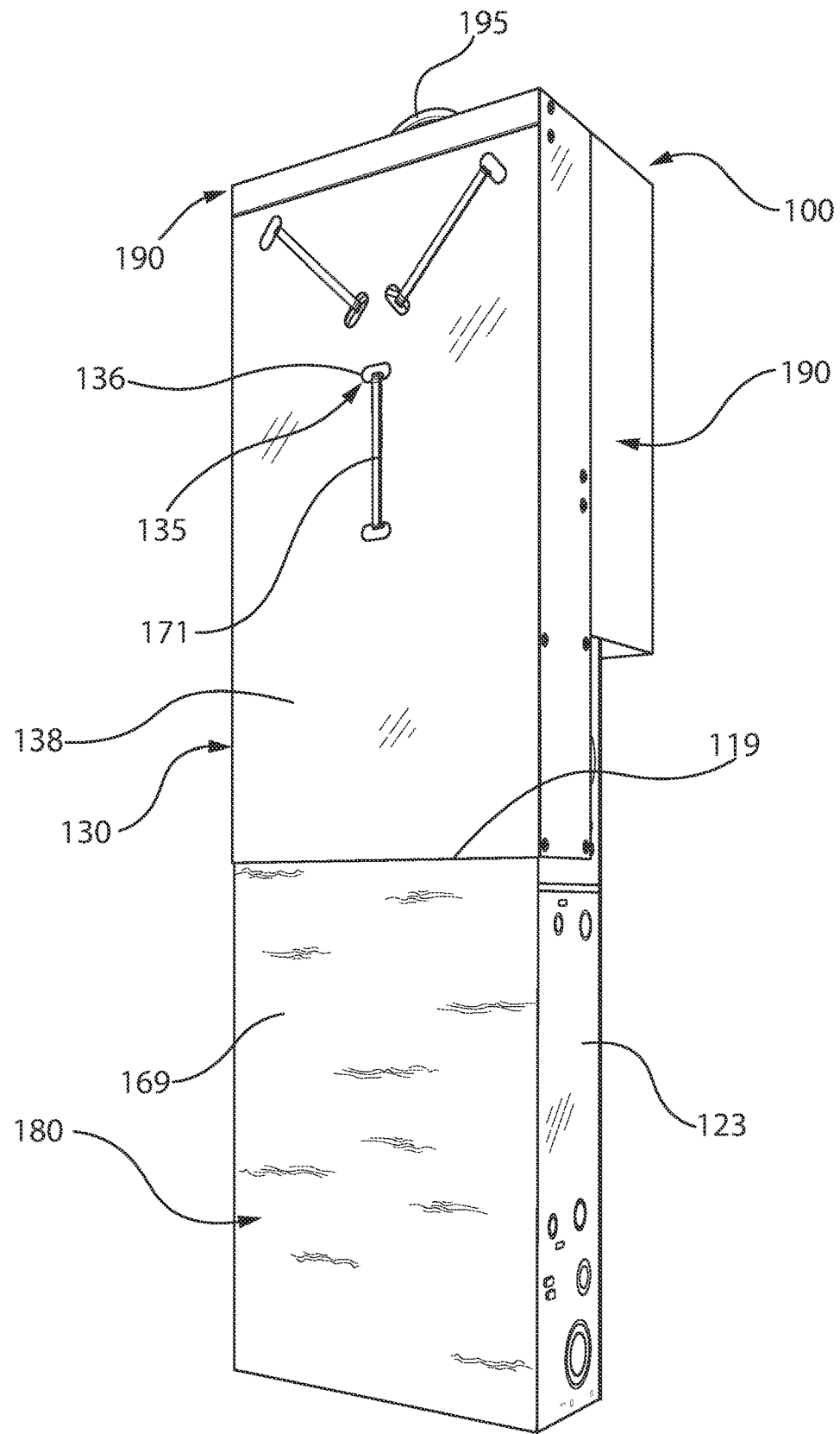
FIG. 6 is a perspective back view of an embodiment of the prefab electrical module of the present invention with the guard cover, temporary panel casing front cover, and waterproof membrane installed.
Figure 8:
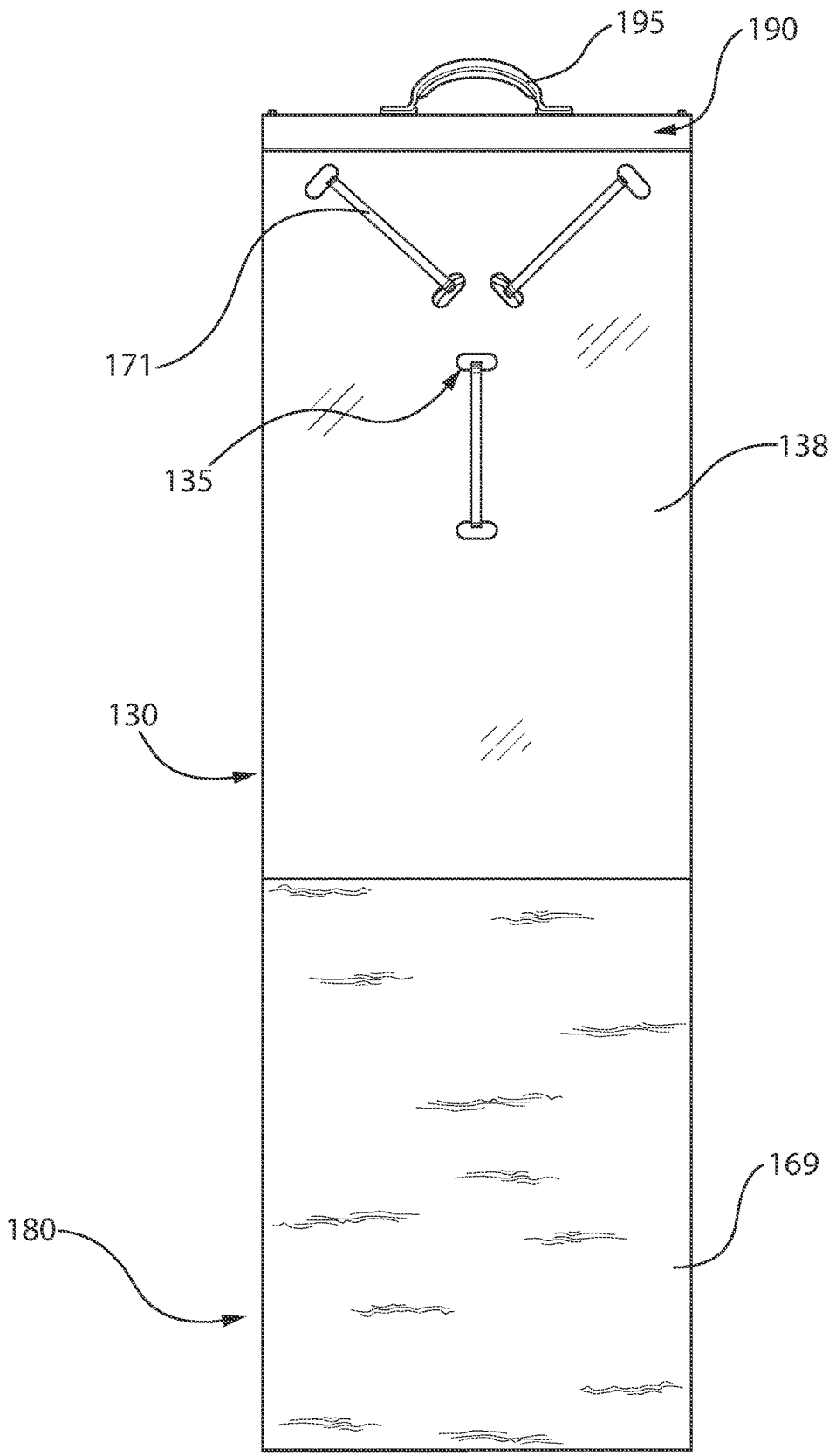
FIG. 8 is a back view of an embodiment of the prefab electrical module of the present invention with the guard cover and waterproof membrane installed.
Figure 9:
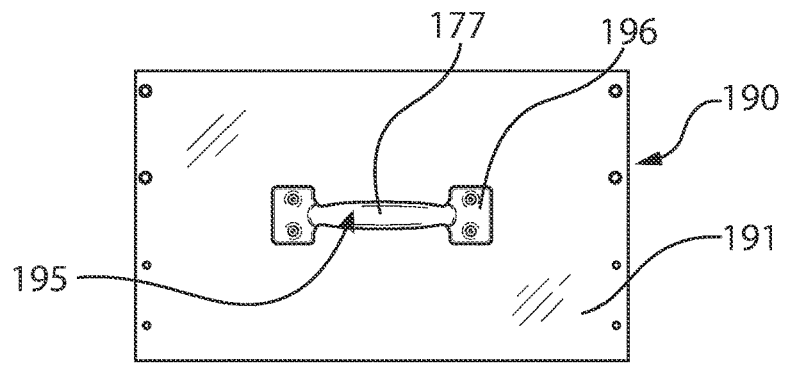
FIG. 9 is a top view of a guard cover of an embodiment of the present invention.
Figure 10:
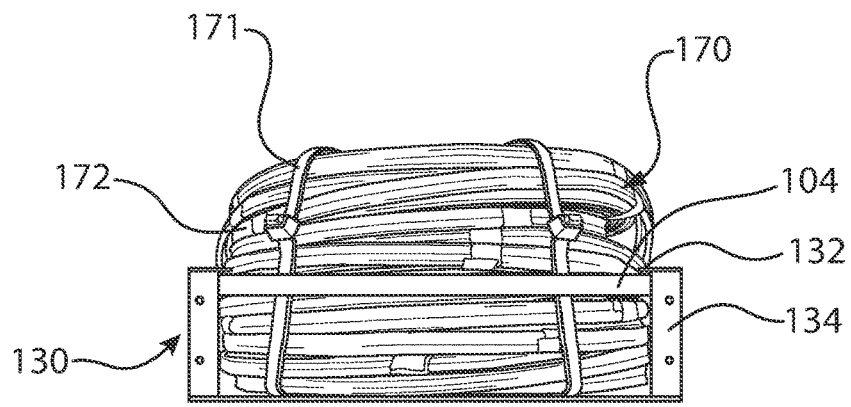
FIG. 10 is a top view of a prefab electrical module of an embodiment of the present invention in which the guard cover is not installed and in which multiple strands of homerun wiring are secured to, and extend forwardly from, the chase.
Figure 11:
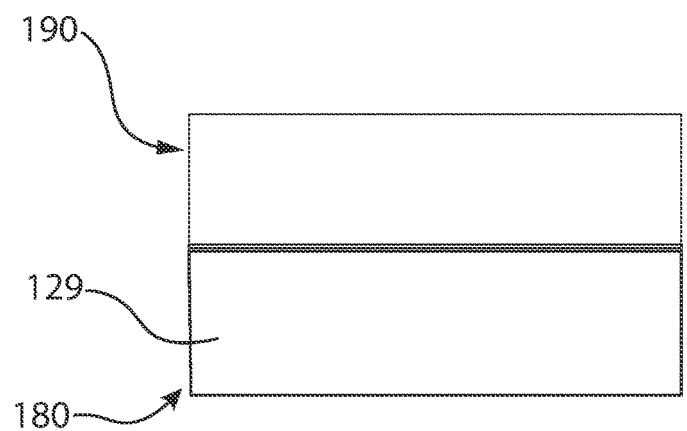
FIG. 11 is a bottom view of a prefab electrical module of an embodiment of the present invention with a temporary panel casing front cover and a guard cover installed.
Figure 12:
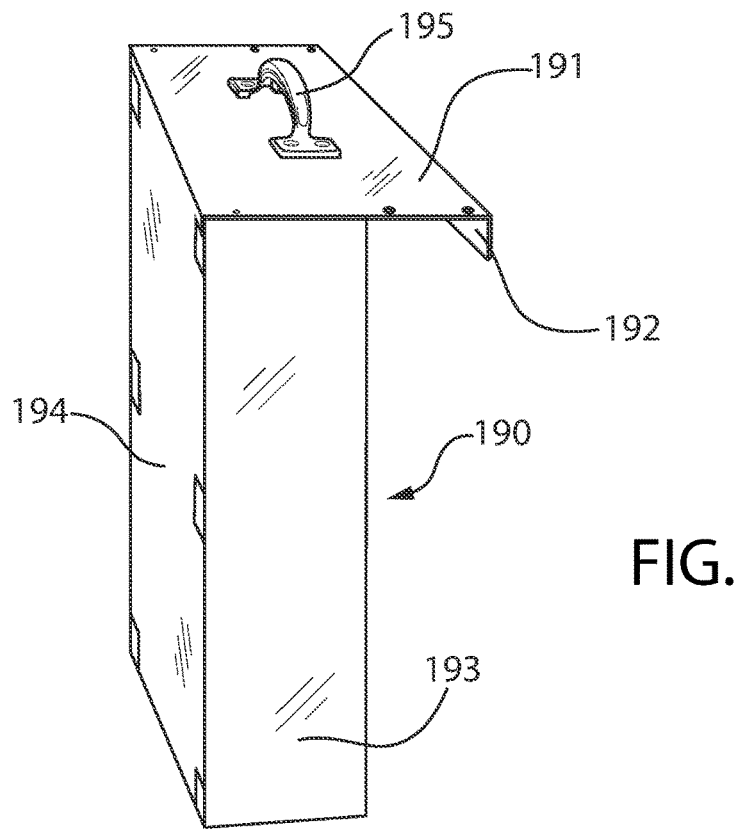
FIG. 12 is a perspective side view of a guard cover of the present invention.
Figure 20:
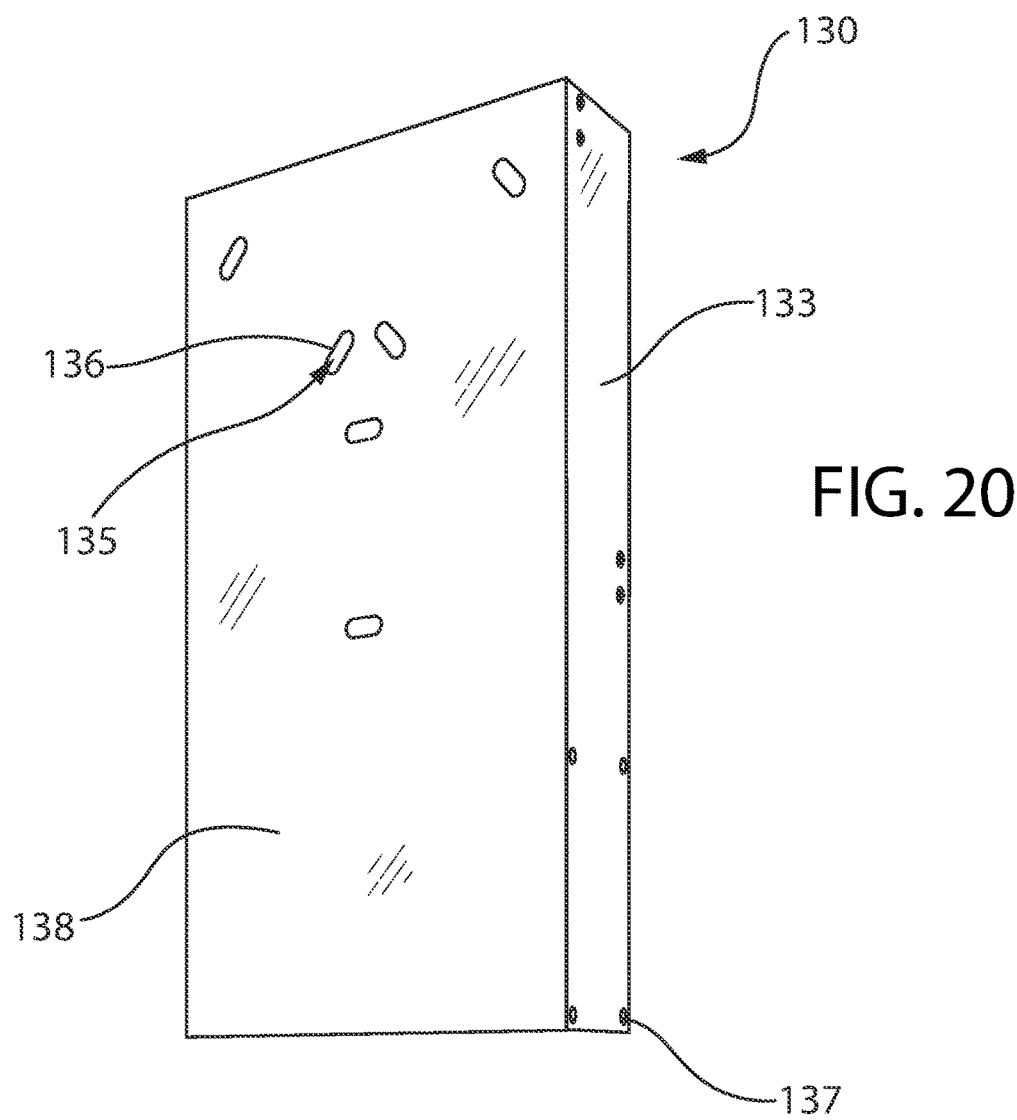
FIG. 20 is a perspective rear view of the chase of the present invention.
Figure 21:
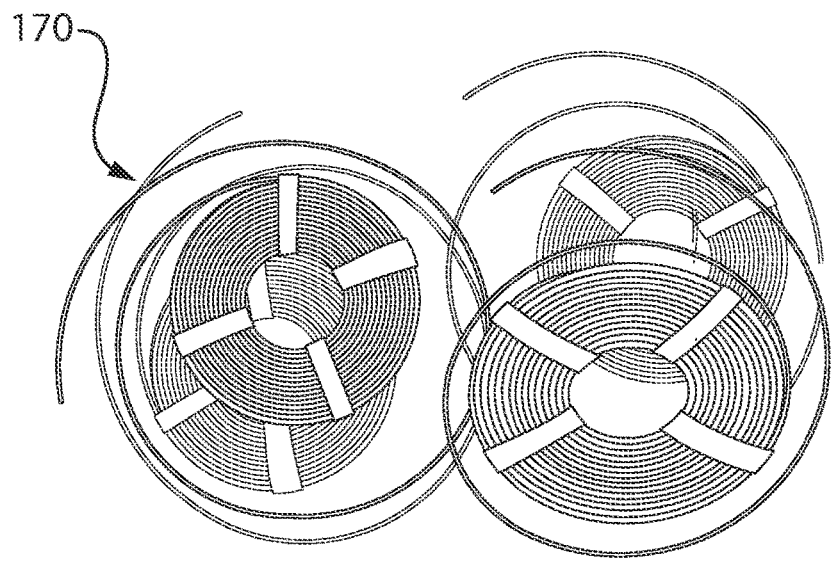
FIG. 21 is a perspective view of homerun strands of wiring of the present invention.

The chase 130, the lower portions of which are attached to the panel casing 180, provides a rigid frame to which the guard cover 190 can be attached. The chase 130 includes a back wall 138 (FIGS. 6, 8, 20), opposing right and left side walls 133, and, preferably, opposing right and left lips 132 (FIG. 2). The back wall 138 provides a rear protective barrier for the wiring 170. The back wall 138 and side walls 133 extend vertically between a chase top edge 131 and a chase back bottom edge 119 (FIG. 6). The back wall 138 extends horizontally between, and forms a right angle with, the side walls 133. The optional opposing right and left lips 132 form right angles with the forwardmost edges 179 of the right and left side walls 133 and provide support for the sides of the chase 130. The lips 132 are disposed on the upper portion of the forward-facing edges of the right and left side walls 133. The right and left lips 132 extend vertically between the chase top edge 131 and a lip bottom edge 139 (FIG. 2). The lips 132 do not extend downwardly the full vertical height of the side walls 133. This allows the lip bottom edge 139 to abut the top of the panel casing 180 when the chase 130 is installed onto the top of the panel casing 180. This is in contrast to the chase side wall 133 that extends downwardly a greater distance (beyond the lip 132) to overlap a top portion of the panel casing side wall 123 for easy attachment of the chase 130 to the panel casing 120. Therefore, the distance from the chase top edge 131 to the lip bottom edge 139 is less than the distance from the chase top edge 131 to the chase back wall and side wall bottom edge 119. Preferably the lip 132 has a vertical length greater than one half of the vertical length of the side wall 133.

In a preferred aspect of the invention, the chase 130 is metal and the back wall 138, opposing right and left side walls 133, and opposing right and left lips 132 are formed integrally and unitarily. In another aspect of the invention the chase 130 may be formed from other materials, such as plastic. In a further aspect, the chase 130 may be formed of multiple components that are fixedly joined together.

The chase 130 is disposed above the top of the panel casing 180. The chase side walls 133 extend downwardly to overlap a portion of the panel casing side walls 123 to provide a strong connection. The chase 130 is fixedly attached 233 (FIG. 23) to the panel casing 180 by connection devices 137, such as by rivets, screws, or bolts, as shown in FIG. 1. Preferably, the chase 130 is fabricated of metal in a metal fabrication shop with laser cutout holes 135 defined by cutout edges 136 that are laser cut into the metal of the back wall 138. In another aspect of the invention, the chase 130 and the panel casing 180 may be formed unitarily with cutouts 135 cut into, or molded or formed within, the back wall 138 of the chase portion of the unitarily formed component. In the preferred aspect of the invention, the circuit breaker panel casing 180 and the chase 130 are formed separately of metal, and the chase 130 has an open top, open bottom, and open front.

One or multiple spreader bars 104 are affixed 234 (FIG. 23) within the upper compartment space no and extend between the chase's opposing side walls 133, as shown in FIG. 1. In the aspect in which the chase 130 and the panel casing 180 are formed unitarily, the spreader bars 104 may be formed unitarily with them.

The spreader bars 104 provide an efficient means to strengthen the chase 130 and provide a useful structure onto which the wiring 170 may be attached. The cutouts 135 are openings that extend through the back wall 138; they provide a convenient means of attachment for wiring-to-chase attachment devices such as zip ties 171. A zip tie 171 may be routed out one cutout 135 and into another cutout 135 and then secured around the wiring 170 to hold it in place. The rearmost coil of wiring 170 is held against the inner surface of the back wall 138 with the other coils of wiring 170 held in front of the rearmost coil. Typically (based on the length of wiring needed for most units), the outermost coils of wiring extend outwardly beyond the outer front edges of the back wall 138 and of the opposing side walls 133 of the chase 130. Thus, the guard cover forward extension is needed to contain the entirety of the wiring 170 and to accomplish sealing the wiring 170 into the module 100 to form a compact entity.

Figure 15:
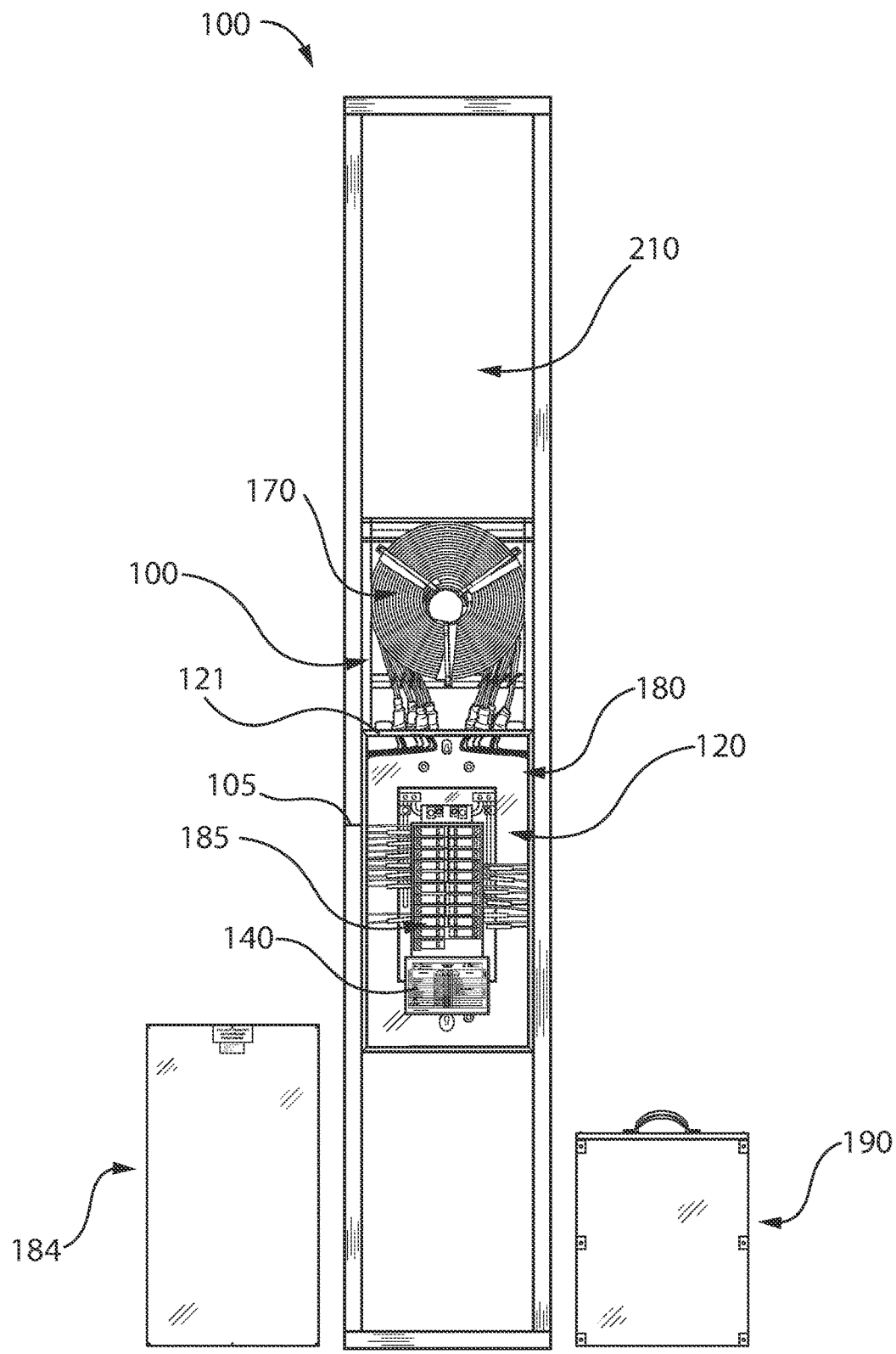
FIG. 15 is a front view of a prefab electrical module of the present invention installed within a stud bay and with the guard cover and temporary panel casing front cover removed.
Figure 22:
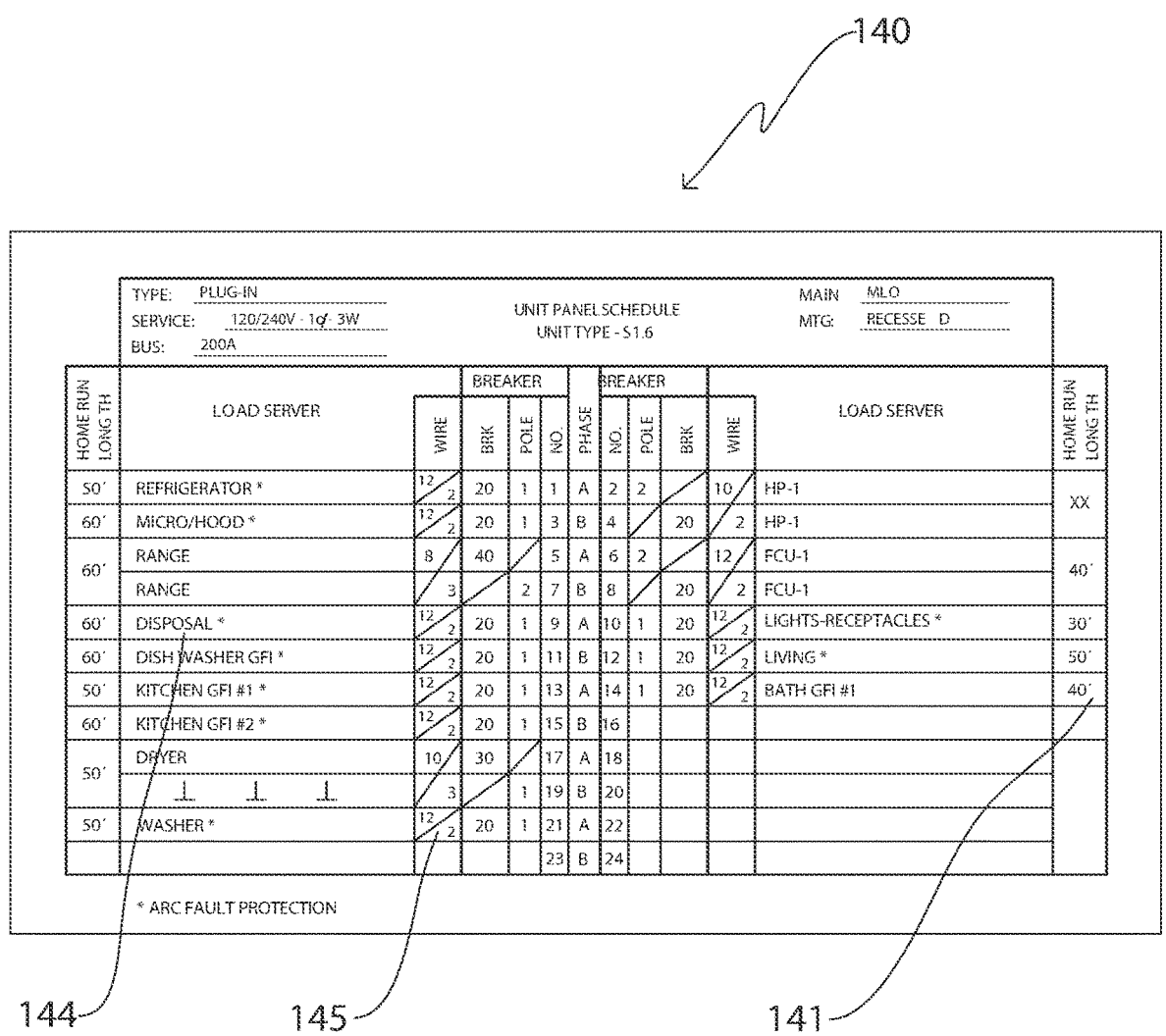
FIG. 22 is a front view of a unit panel schedule utilized in the fabrication and the installation of the prefab electrical modules of the present invention.

To customize the prefab electrical module 100 for the specific unit into which it will be installed, an electrical unit layout is engineered for that specific unit, and a unit panel schedule 140 (FIGS. 15, 22) is prepared based on that predetermined, engineered layout. It will be used both by the prefab electricians to measure and cut wiring and to wire the breakers of the module 100 and by the electricians at the construction site to install the homerun wiring 170 of the module 100. In an example, to prepare an accurate unit panel schedule 140 during the process of the construction of multi-unit residential or commercial buildings, the electrical contractor supplies to the framer the desired locations for the main service electrical service and/or the components (switches and receptacles). Coordination meetings ensure that the locations provided are acceptable. Once the locations have been verified and approval has been received, the electrical contractor prepares a written plan including roping diagrams and boxing diagrams specifying the locations of all devices within the units. The electrical contractor identifies pathways for each circuit and the length to their homerun locations. Based on this, the electrical contractor identifies all components (switches and receptacles) that will be used within the residential or commercial unit and creates an electrical unit layout or prefab plan that uses one (or, at times, more) of the weatherized prefab electrical modules 100. A unit panel schedule 140 and unit layout (based on the electrical unit layout) are prepared 231 (FIG. 23) for each unit. Since multiple units of the same design are typically included in a multi-unit building or in a housing development, typically the unit panel schedules 140 and unit layouts will be applicable to multiple units within a construction phase.

The unit panel schedule 140 lists the specifications for the wire 170 needed for each circuit. The specifications may include homerun wire footages 141, the wiring type 145, and the load/breaker name 144, unit type, type of breaker 186, and the like. Preferably each of the homerun wire footages 141 is color-coded. The unit panel schedule 140 is printed out and preferably laminated for jobsite durability. After making up the circuit breaker panel, a printed copy of the unit panel schedule 140 will be attached 261 (FIG. 23) (such as via a zip tie) within the circuit breaker panel casing 180 for use by the electricians at the jobsite.

Figure 23:
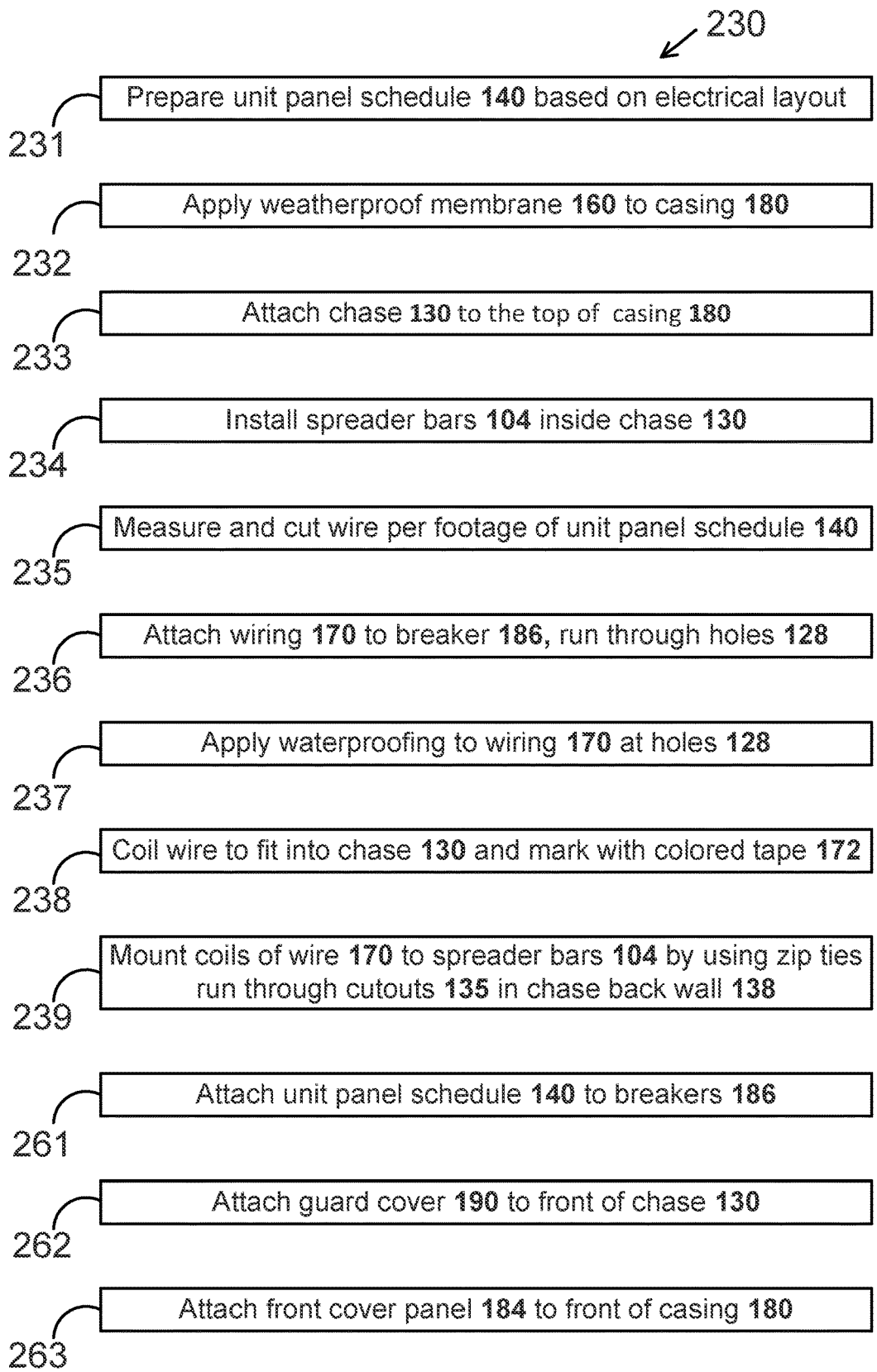
FIG. 23 is a flowchart showing a method of fabrication of a prefab electrical module of the present invention.
Figure 24:
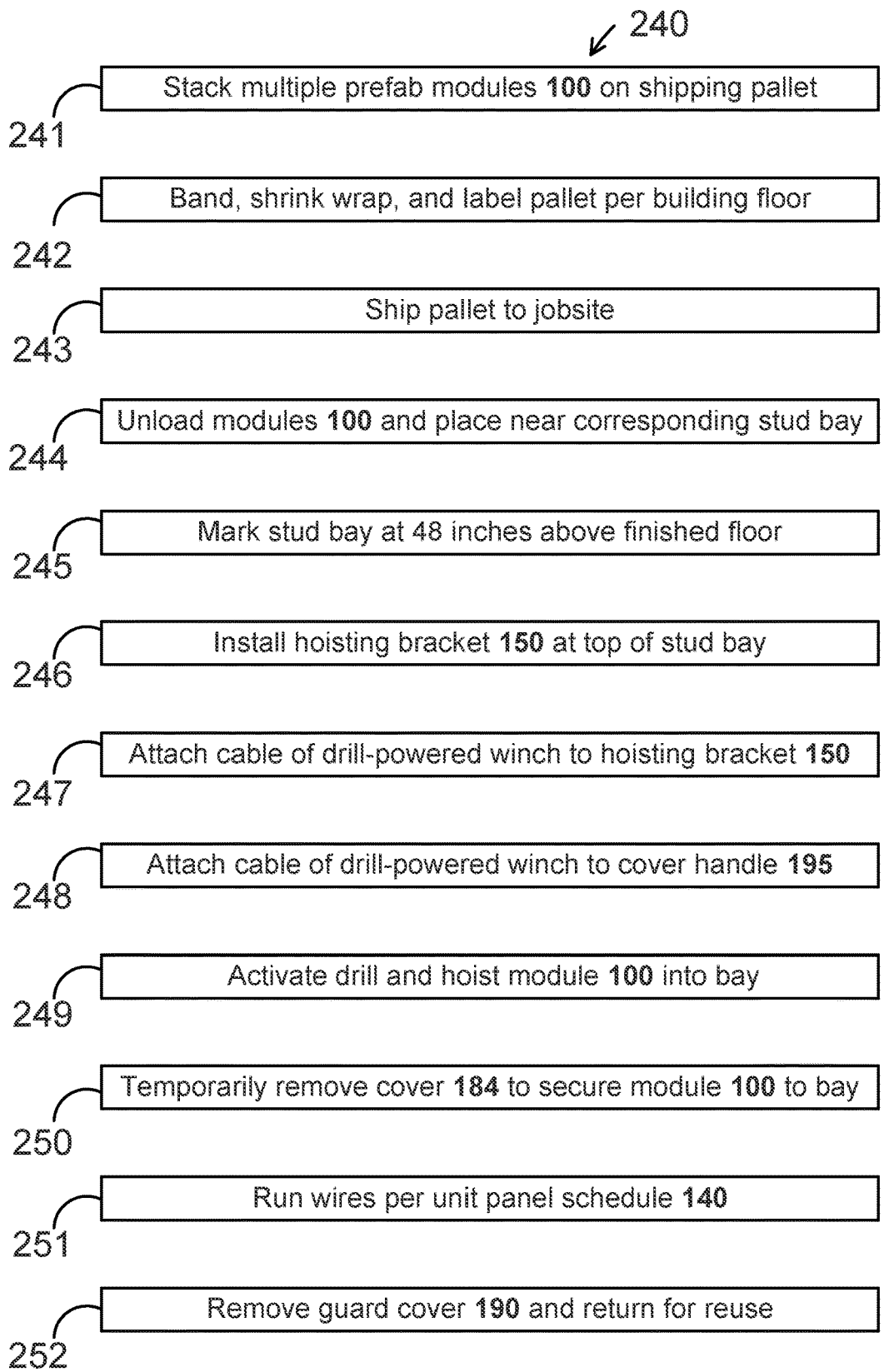
FIG. 24 is a flowchart showing methods of shipping the prefab electrical module of the present invention and of mounting it within a wall stud bay at a construction site.

To begin to make up the circuit breaker panel for a unit, lengths of homerun wiring are measured and cut 235 (FIG. 23). Using the unit panel schedule 140 to determine the wire lengths needed for each breaker 186, the electrical wiring 170 is cut in footages that match the footages listed on the panel schedule 140. In the preferred embodiment of the invention, weatherproof electrical wiring, such as UF wire or outdoor wiring, is used instead of the typical non-weatherproof wire, such as sold under the trademark ROMEX. The weatherproof electrical wiring has an encasement that protects each interior wire and does not allow moisture or other external elements to travel to the inside of the cable.

An electrician at the electric prefab facility follows the specifics of the unit panel schedule 140 to connect the proximal end of each wire 170 to the proper breaker 186 within the circuit breaker panel casing 180. The circuit breaker panel is completely wired and labeled with stickers or other labels designating the circuit (such as labeling the circuits for the kitchen, bathrooms, air conditioner, bedroom, oven, etc.). The proximal end of a section of wiring 170 is attached to the circuit breaker 186. The remainder of the wiring 170 (beyond the attached proximal end) is extended away from the breaker 186 and is run upward through the exit holes 128 of the panel casing top wall 121. Thus, each strand of wiring 170 extends 236 (FIG. 23) from a breaker 186 through a hole 128 in the panel casing top wall 121 into the chase 130.

The lengths of wiring 170 are coiled 238 (FIG. 23) to form a coil having a width less than the width of the chase 130. In a preferred aspect of the invention, the UF wiring 170 is flat and can be coiled tightly to minimize the space needed for the coils. The coils are marked with a colored identifying agent 172 and stored attached to the chase 130. The colored identifying agent 172 may be colored tape, colored tie(s), or the like. For conformity and ease of use, the colored identifying agent also coordinates with the color of the location and/or the color designating a wiring length of the panel schedule 140. Preferably, the color of the colored identifying agent corresponds to a particular length and corresponds to the color of the wiring length on the panel schedule 140, to aid the electrician at the jobsite. For example, red colored tape is attached to the coil of wire that has been connected to the breaker for the dining room, and the dining room name and/or coil length is designated with red highlighting or coloring on the panel schedule. In a second example, red colored tape is attached to any coil of wire that has a homerun length of 50 feet, and the length of 50 feet is designated with red highlighting or coloring on the panel schedule. This color labeling reduces errors in the onsite installation.

The wire 170 may be first attached to the breaker 186 and run up through one of the holes 128 in the panel casing top wall 121 to be coiled in the upper compartment space no, or the wire 170 may first be coiled with a portion run downward through a hole 128 and then connected to a breaker 186. Preferably a sleeve 115 (such as a plastic sleeve) is installed within the panel casing top wall hole 128, and the wire is run through a center opening in the sleeve 115. The sleeve 115 acts to protect the wiring from abrasion caused by rubbing against the sides of the hole 128. The portion of wire 170 disposed at the hole 128 and the sleeve 115 is waterproofed 237 (FIG. 23) such as with a waterproofing material 175, for example the electrical insulation putty sold under the trademark 3M. The waterproofing material 175 is applied at the top of the sleeve 115 to seal the top of the center opening and applied around the portion of wire exiting the opening at the top of the sleeve 115. Preferably it extends from the wiring downward to cover the sleeve 115 and to end at the top of the panel casing 180, as seen in FIGS. 1-2. The waterproofing material 175 is preferably sticky and self-adhering (such as the electrical putty), which prevents any water from entering the circuit breaker panel casing 180 through the holes 128 or through the sleeve 115 lining the hole 128.

The wiring coils are secured 239 (FIG. 23) with a binding device 171, such as heavy-duty zip ties, within the chase 130; this holds the wiring 170 in a tidy and organized manner for shipping to the construction site. The zip ties 171 are run around the coils and around one or more spreader bars 104, routed out one cutout 135 in the chase back wall 138 and back into the upper compartment via a second cutout 135, and then tightened. When needed to meet applicable regional regulations, the zip tie 171 connects the wiring 170 to the lower spreader bar 104, such as to meet a twelve-inch strapping code requirement. Additional supports 134 may be added as needed based on such factors as the strength of the chase 130 material and the amount of wiring 170 to be carried within the chase 130.

After the proximal end of each wire 170 in the lower compartment space 120 is neatly installed and landed into a breaker 186 per the designation of the unit panel schedule 140, the inside of the panel casing 180 is preferably vacuumed. A laminated printed copy of a unit panel schedule 140 is attached 261 (FIG. 23) inside, such as by a zip tie. A waterproof seal 122 is created between the front edge of the panel casing 180 and a panel casing front cover 184 that will temporarily be attached to the front of the panel casing 180 for shipping. For example, a foam waterproof gasket or weatherstrip 122 may be installed around the face of the panel casing 180 to create the waterproof seal. Preferably, the side of the panel casing 180 is marked with a height-designating line 181, which can be used at the jobsite to position the module 100 to the correct height for installation. The prefab electrical module 100 is then sent to a quality control station and each step is checked and inspected for quality.

When preparing the prefab electrical module 100 for shipping to the jobsite, the shipping components, a temporary chase guard cover 190 and a temporary panel casing front cover 184, are attached 262, 263 to the fronts of the chase 130 and the circuit breaker panel casing 180, respectively. Both covers remain protecting the internal components of the module 100 during transport to the jobsite and, after the module 100 is installed in the stud bay 210, until the unit is wired with the homerun wiring carried by the module 100.

Figure 7:
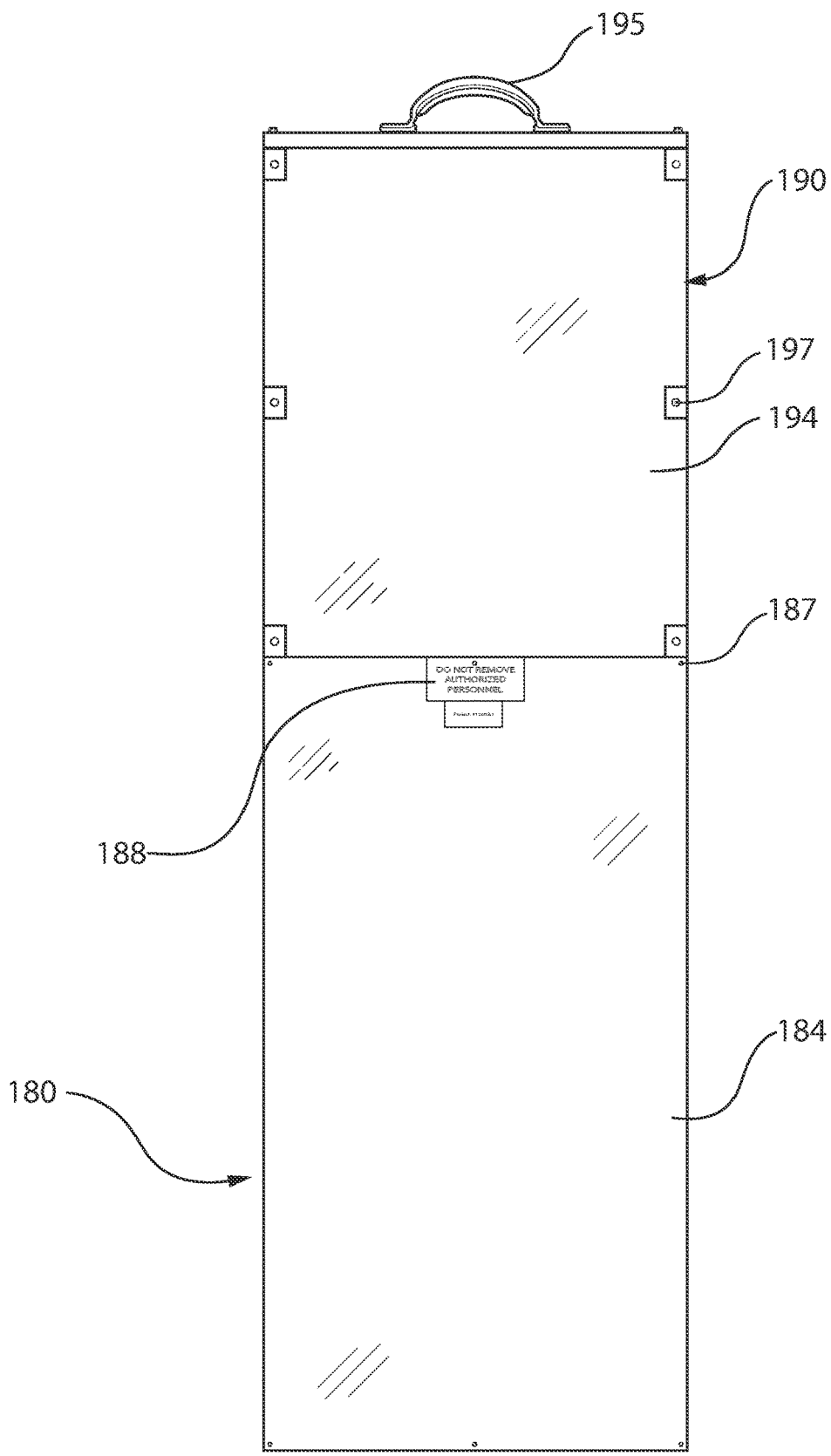
FIG. 7 is a front view of an embodiment of the prefab electrical module of the present invention with the guard cover and temporary panel casing front cover installed.
Figure 13:
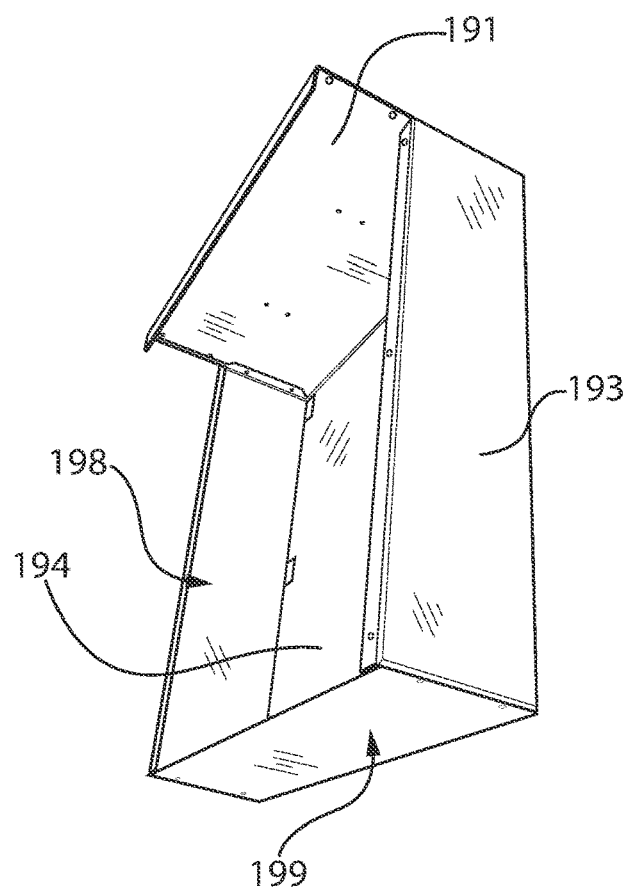
FIG. 13 is a perspective rear view of a guard cover of the present invention.

The guard cover 190 includes a top wall 191 (FIGS. 4, 13, 14), opposing side walls 193, a bottom wall 199, and a front wall 194. The front wall 194 extends vertically between the bottom wall 199 and the top wall 191 and extends horizontally between the opposing side walls 193. The opposing side walls 193 and the bottom wall 199 have a depth less than the depth of the top wall 191. When the guard cover 190 is installed, the wiring extending forwardly beyond the frontmost portions of the chase 130 is accommodated within the forward wiring-receiving portion 198 of the guard cover 190 defined by the forward portion of the top wall 191, the opposing side walls 193, the bottom wall 199, and the front wall 194. The rearward portion of the top wall 191 extends over and forms a lid for the top of the chase 130. Thus, the greater depth of the top wall 191 allows the top wall 191 to extend not only over the forwardly extending wiring, but also over the top of the chase 130. Preferably the guard cover 190 is affixed to the front of the chase 130 by the utilization of self-tapping screws 197 (FIG. 7).

The top wall 191 includes a hoisting handle 195 and preferably a back lip 192. The back lip 192 extends downwardly a short distance to overlap the top back of the chase 130 to prevent water intrusion and to provide support.

The hoisting handle 195 is used both for hoisting the module 100 into the stud bay 210 and for manual handling of the module 100, such as for moving the module 100 onto and off a pallet of modules 100. The hoisting handle 195 is securely attached to the top wall 191 and extends upwardly from the top wall 191. Though the hoisting handle 195 is illustrated in a handle shape, the hoisting handle 195 may take other forms, such as a loop. The housing handle 195 includes two ends 196 that are attached to the top wall 191 and with a center segment 177 fixedly attached between the opposing ends 177, such as by rivets or other robust attachment mechanisms. The center segment 177 is elevated above the top wall 191 to allow attachment of a fastener or hook 225, for use in the installation of the module 100. In an example, the hoisting handle 195 has a first end 196 attached to the top wall 191, a second end 196 attached to the top wall 191 at a distance from the first end's attachment point, and a shaft 177 extending between the first and second ends 196. Though shown as fixedly and permanently attached, the hoisting handle 195 may be temporarily attached, such as by the use of bolts with nuts.

The temporary panel casing front cover 184 is a sheet of material that is sized to cover the front opening of the circuit breaker panel casing 180. Preferably the sheet of material is metal, though plastic or other waterproof material may be used. The panel casing front cover 184 is preferably screwed down onto the face of the circuit breaker panel casing 180 with multiple tamper-resistant casing self-tapping screws 187 (FIG. 7). Tamper-resistant screws are preferred to reduce theft. Optionally, cardboard and/or plastic may be installed over all or part of the front of the module 100 to secure and protect the interior elements during transport. Also optionally, a plastic membrane may be wrapped around all or part of the module 100 if needed, as based on shipping considerations.

Labeling of the completed module 100 identifies pertinent unit-specific information such as the name of the building into which the electrical module 100 will be installed, the name of the construction project, the name of a phase of a project, the building owner's name, the number or name of the unit, and/or other relevant unit-specific information that is important to convey to the installing electrician. Labels or stickers 188 (FIGS. 7, 14, 15) are preferably applied to the front surface of the temporary panel casing front cover 184 to indicate this pertinent unit-specific information.

In an example of a field installation at a construction site, the completed prefab electrical module 100 (including the components that will be permanently installed and the shipping components) is then transported to the construction site on a pallet with other modules for nearby units.

In the case of multi-unit construction, multiple modules 100 that are needed for installation into the same building or floor are also fabricated using their own predetermined, engineered unit panel schedule 140 and the unit layout as a guide. Though designed for different units, the modules are preferably a consistent width, depth, and height (for example, all modules are preferably 4 feet in height to fit on a conventional pallet). An entire floor of modules for apartment units or for a section of homes in a housing development can be shipped out at once.

After completion of the modules 100, the multiple modules 100 are then stacked 241 (FIG. 24) on a shipping pallet. The pallet is banded, shrink wrapped, and labeled 242 (FIG. 24) with data (such as by a label similar to the label 188 of FIGS. 7, 14, 15) to identify the location of installation (such as the complex name, section name, building name, and/or building floor). The pallet is then shipped 243 to the construction site. In a preferred aspect of the invention, the pallet is then unloaded 244 and positioned on or near the corresponding floor or section. The modules 100 are removed from the pallet, loaded onto a flat cart to be manually rolled to the door of the correct unit, and then placed near the stud bay 210 into which the module 100 will be installed. The correct unit can be identified by looking at the label 188 attached to the front of the module 100.

Before installation of the prefab electrical module 100, the vertical stud at the side of the stud bay 210 is indicated 245 (FIG. 24) with a mark 105 (FIG. 15) at the particular height that satisfies the local regulations in affect at the location of the unit. For example, with a general service electrical breaker panel, the proper mounting height may typically be 48 inches. The mark 105 on the stud is correlated with the height-designating line 181 of the module 100.

To install the prefab electrical module 100, installation components of the prefab electrical system are used. These include a reusable hoisting bracket iso and a drill hoist 220 powered by a drill 221.

Figure 16:
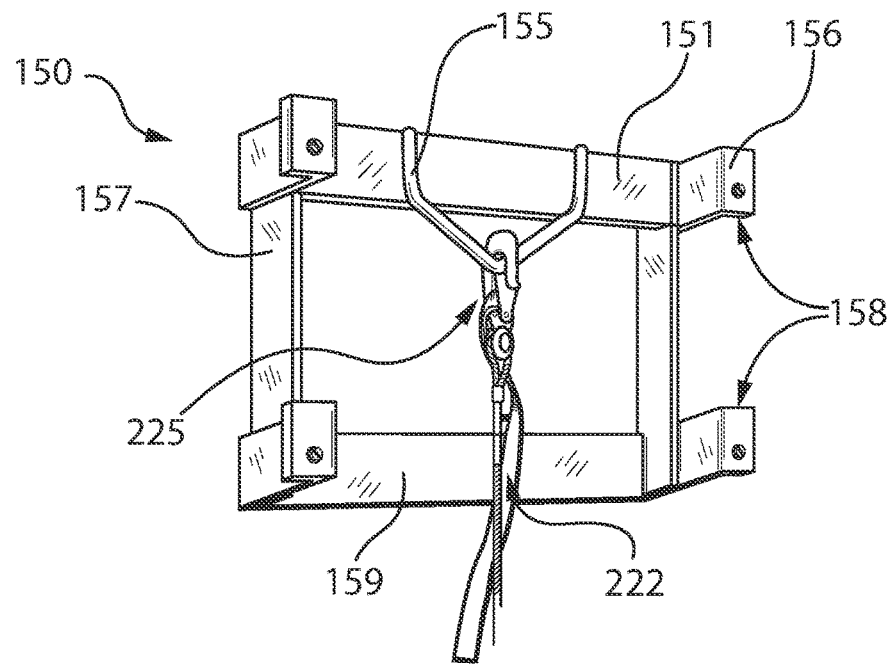
FIG. 16 is a perspective front view of a hoisting bracket of the present invention.
Figure 17:
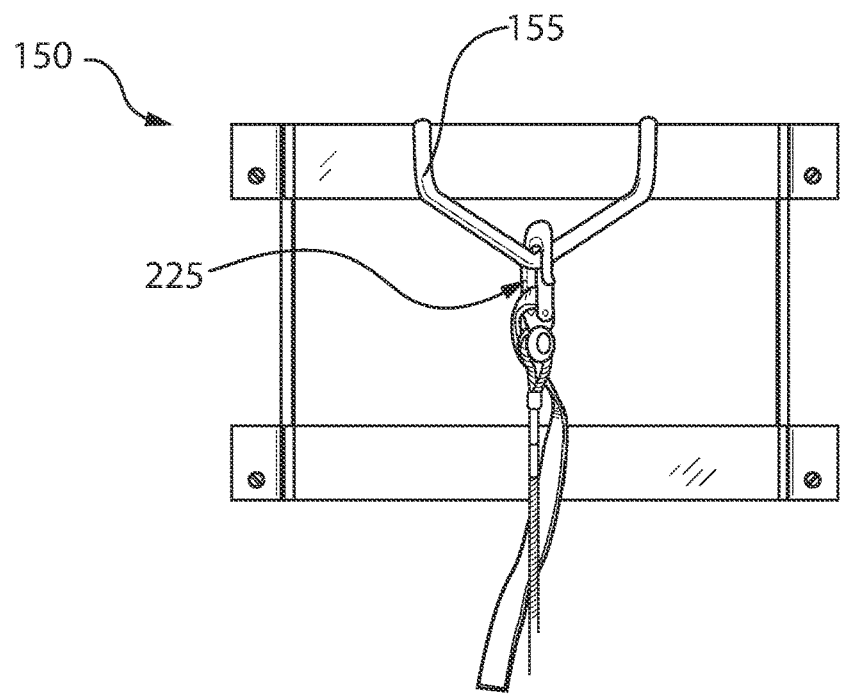
FIG. 17 is a front view of the hoisting bracket of the present invention.

The hoisting bracket 15o, as seen in FIGS. 14 and 16-17, is a structure that can be firmly affixed 246 within the top of the stud bay 210 securely enough to allow the hoist 220 to lift the module 100 into place. The hoisting bracket iso includes a securely attached hoisting loop 155. This loop 155 provides a connection point for a connector 225 connected to a cable 222 of the hoist 220.

In an exemplary construction shown in the figures, the hoisting bracket iso (FIGS. 14, 16-17) includes two vertical members 157, two horizontal members (upper horizontal member 151, and lower horizontal member 159), and four forwardly extending braces 158. The upper and lower horizontal members fit in the space between the two vertical 2×4 studs that form the vertical members of the stud bay 210. The left and right vertical members are spaced to fit within the opening between the vertical 2×4 studs (which are typically wooden studs but may be metal studs, as is common in some localities) and adjacent to the inner surface of the vertical 2×4 studs. The upper and lower ends of each of the vertical members 157 are connected to the upper horizontal member 151 and to the lower horizontal member 159, respectively. The hoisting loop 155 is fixedly and robustly attached to the hoisting bracket 150 and preferably to the upper horizontal member 151.

The four braces 158 each serve as an attachment point for attaching the hoisting bracket 150 to the upper end of the stud bay 210. The two right braces 158 have a forwardly extending portion that extends from the upper and lower ends, respectively, of the right vertical member 157. The two left braces 158 have a forwardly extending portion that extends from the upper and lower ends, respectively, of the left vertical member 157. The four braces 158 have a face portion 156 extending outwardly from the forward ends of the forwardly extending brace portions. When the hoisting bracket 150 is installed within the bay, the face portions 156 will be adjacent to the front face of the vertical studs of the stud bay 210. Each brace face portion 156 has a hole that receives a screw. A screw is inserted into the hole of a face portion 156 and is screwed into the wood of the front face of the vertical stud.

Though the module 100 may be lifted into the bay 210 manually, in a preferred aspect of the invention, a portable drill winch 220 and portable drill 221 are used so that the module may be elevated at the push of a button. In a preferred embodiment, the portable handheld drill winch 220, which has a sufficient single line pulling capacity to lift the module 100, is powered by a standard, portable drill 221. The hoisting connection means 222 (such as a cable, chain, or rope, which may be steel or synthetic) is attached 247, 248 (FIG. 24) by upper and lower rigging hooks 225 to the hoisting handle 195 of the guard cover 190 and to the hoisting loop 155 of the hoisting bracket 150. The drill 221 is then activated 249 (FIG. 24) to power the drill winch 220 to hoist the module 100 into the stud bay 210. The height to which the module 100 will be lifted is determined by matching the height-designating line 181 of the circuit breaker panel casing 180 to the regulation height line 105 that has been marked on side of the bay 210.

The module 100 is then fixedly attached within the bay 210 by attachment devices. In a preferred example, the temporary panel casing front cover 184 is then briefly removed 250 (FIG. 24) to allow screws to be inserted through the panel casing side walls 123 and into the vertical studs at the sides of the stud bay 210. This secures the module 100 in place. The temporary panel casing front cover 184 is then screwed back onto the front of the panel casing 180. (The panel casing front cover 184 will remain in place until the dwelling or office is completed.)

Even though the electrical module 100 is installed into the stud bay, the onsite electricians can remove the guard cover 190 from the front of the panel casing 180 to access the homerun wring 170. (If the top wall 191 includes a back lip 192, the back lip 192 may be released by slightly elevating the guard cover 190 as it is removed.) The electricians then run 251 (FIG. 24) the homerun wiring 170 using the unit panel schedule 140 as a guide. The wires 170 are uncoiled, holes are drilled at the top of the stud bay 210, and the wires 170 are routed to their final locations.

After running the homerun wiring 170, the guard cover 190 that was removed can be returned 252 (FIG. 24) to the prefabrication facility to be used with another module wo to be produced. The weatherproof electrical putty 175 and foam gasket maintain the inside of the circuit breaker panel casing 180 free from moisture until upper floors and/or a roof are established in the building. After dry-in, any remaining electrical devices (such as a non-weatherized switches or receptacles) are installed.

After the dwelling or commercial building is completed and painted, the temporary panel casing front cover 184 is removed from the front of the panel casing 180 and may be returned to the fabrication facility for reuse or may be recycled.

Though the modules 100 shown are weatherized with the panel casing 180 and the wiring 170 weatherproof and able to be installed before dry-in of a building, in another aspect of the invention, the module 100 is produced in a non-weatherized version. In the non-weatherized embodiment, the panel casing 180 enclosing the circuit breaker is not required to have weatherproof membrane installed, the putty 175 is not required, and the wiring 170 need not be type UF cable, but it may instead be non-weatherized wiring, such as sold under the trademark ROMEX. Non-weatherized modules 100 may be suitable for usage at facilities such as a manufactured home production facility. In that use case, pallets of premade modules 100 may be prepared based on the engineered plans for the manufactured homes to be produced.

In another embodiment of the invention, the modules 100 are prepared for installation into prefabricated walls being assembled at a wall prefabrication factory instead of being prepared for field installation at a construction site. For the installation in a wall fabrication factory, the modules 100 may or may not be weatherized.

The palletized modules 100 will be shipped to the wall fabrication factory. Each module 100 is installed within its specified bay in a prefabricated wall at the proper mounting height per the electrical layout and unit panel schedule 140. Then the wall unit is shipped to the jobsite with the module 100 installed within the prefabricated wall unit. The wall units are hoisted into their proper location. If weatherized panel casing 180 and wiring 170 has been provided, the onsite electricians do not need to wait for dry-in to begin to run the wiring 170. After the building unit has been dried-in, any remaining non-weatherized devices are installed. If the module 100 is non-weatherized, the wiring 170 may be unfurled and connected to devices located in nearby bays after dry-in of the unit has been achieved. Other facilities may also use a prefabricated wall with a non-weatherized module 100, such as a manufactured home construction facility.

Whether the modules 100 are installed directly into multi-unit construction or are installed at a wall fabrication facility they save onsite construction time and costs. The standardization of the modules 100 and fabrication in a module fabrication facility reduces material waste and increases consistency and uniformity for both the weatherized and non-weatherized embodiments of the modules 100. Each module 100 goes through strict quality control checks by experienced electricians, which provides quality control to the building developers and owners, and which, thus, reduces costly mistakes.

In the preferred embodiment in which the modules 100 are weatherized, the construction timeline is advanced (compared to the conventional method of making up individual circuit breaker panels one by one in the field), which allows income generation from sales or rentals to begin earlier. Onsite electricians can begin the electrical installation weeks to months earlier, before the building has windows and a roof, due to the waterproof nature of the module 100 and the wiring 17. This allows the rough electrical inspection to be performed weeks to months earlier.

The inventive modules 100 provide additional advantages. The most time-consuming part of installing an electrical system, making up the panel, is done at the module fabrication facility, thus saving time at the jobsite. Time-consuming mistakes are eliminated (such as often occur when different electricians make up the circuit breaker panels differently). Having wiring 170 pre-measured and pre-cut to exact measurements and ready for the onsite electrician saves material wastage. The disclosed standardized modules 100 can be palletized and shipped economically anywhere in the world.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A prefabricated electrical system, comprising:
    a prefab electrical module comprising:
        a panel casing defining a lower compartment space accommodating multiple circuit breakers; said panel casing comprising a waterproof membrane affixed to a top surface and a back surface of said panel casing; said top surface; wherein said top surface is configured with casing holes defined by casing hole edges;
        a chase disposed above said panel casing and defining a rearward portion of an upper compartment; and
        a guard cover removably attachable to and detachable from a front portion of said chase and defining a forward portion of said upper compartment; and
    multiple lengths of homerun wiring, each of which comprise a coil formed of an upper portion of a first length of homerun wiring disposed within said upper compartment, a middle portion of said first length of homerun wiring extending through said casing holes, and a lower portion of said first length of homerun wiring attached to one of said multiple circuit breakers.

2. The prefabricated electrical system as recited in claim 1, wherein said waterproof membrane comprises a rubberized asphalt.

3. The prefabricated electrical system as recited in claim 1, wherein said waterproof membrane comprises a self-adhering roofing underlayment.

4. The prefabricated electrical system as recited in claim 1, further comprising a unit circuit panel schedule for a specific unit to be constructed that is removably attached within said lower compartment space and that displays electrical information for said specific unit; wherein each of said multiple lengths of homerun wiring has a length indicated by said unit circuit panel schedule.

5. The prefabricated electrical system as recited in claim 4, further comprising a colored identifying agent attached to each of said multiple lengths of homerun wiring; wherein said unit circuit panel schedule comprises a color designating a wire length or an installation location; wherein a color of said colored identifying agent corresponds to at least one of said color designating a wire length or an installation location.

6. The prefabricated electrical system as recited in claim 1, wherein said each of said multiple lengths of homerun wiring comprises weatherized UF wiring.

7. The prefabricated electrical system as recited in claim 1, further comprising waterproofing material disposed at said casing holes to increase water resistance of said panel casing.

8. The prefabricated electrical system as recited in claim 7, wherein no waterproof membrane is disposed on an exterior surface of said chase; and wherein no waterproof membrane is disposed on an exterior surface of said guard cover.

9. The prefabricated electrical system as recited in claim 1, wherein said coil formed of an upper portion of a first length of homerun wiring extends outwardly beyond rearward portion of an upper compartment formed by said chase and, after installation of said guard cover, extends into said guard cover.

10. The prefabricated electrical system as recited in claim 1, wherein said chase comprises a chase back wall configured with cutout holes defined by cutout edges disposed within said chase back wall to receive wiring-to-chase attachment devices to secure said multiple lengths of homerun wiring within said upper compartment.

11. The prefabricated electrical system as recited in claim 1, wherein said prefab electrical module further comprises a panel casing front cover that is attachable to, and removable from, a front of said panel casing.

12. The prefabricated electrical system as recited in claim 11, wherein said panel casing front cover is, after removal, reusable with additional prefab electrical modules.

13. The prefabricated electrical system as recited in claim 1, wherein said guard cover is, after removal, reusable with additional prefab electrical modules.

14. The prefabricated electrical system as recited in claim 1, wherein said guard cover comprises a guard cover top wall and a hoisting handle disposed on said guard cover top wall for hoisting said prefab electrical module.

15. The prefabricated electrical system as recited in claim 14, further comprising:
    a hoisting bracket removably attachable within a stud bay; and a hoisting connection means to connect said hoisting bracket to said hoisting handle to allow said prefabricated electrical module to be hoisted into a stud bay.

\* \* \* \* \*